(12) United States Patent
Struble et al.

(10) Patent No.: US 11,914,280 B2
(45) Date of Patent: Feb. 27, 2024

(54) THERMAL PROCESSING DRUM

(71) Applicant: CARESTREAM HEALTH, INC., Rochester, NY (US)

(72) Inventors: Kent R. Struble, Woodbury, MN (US); Joel C. Marsh, New Richmond, WI (US); Daniel J. Peick, Apple Valley, MN (US)

(73) Assignee: Carestream Health, Inc., Rochester, NY (US)

( * ) Notice: Subject to any disclaimer, the term of this patent is extended or adjusted under 35 U.S.C. 154(b) by 920 days.

(21) Appl. No.: 16/766,828

(22) PCT Filed: Dec. 18, 2018

(86) PCT No.: PCT/US2018/066194
§ 371 (c)(1),
(2) Date: May 26, 2020

(87) PCT Pub. No.: WO2019/126143
PCT Pub. Date: Jun. 27, 2019

(65) Prior Publication Data
US 2020/0319544 A1 Oct. 8, 2020

Related U.S. Application Data

(60) Provisional application No. 62/643,070, filed on Mar. 14, 2018, provisional application No. 62/609,510, filed on Dec. 22, 2017.

(51) Int. Cl.
*G03D 13/00* (2006.01)
*G03B 27/30* (2006.01)
(Continued)

(52) U.S. Cl.
CPC ......... *G03D 13/002* (2013.01); *G03B 27/306* (2013.01); *G03C 1/494* (2013.01); *G03C 8/40* (2013.01); *H05B 3/0033* (2013.01)

(58) Field of Classification Search
CPC ................................. B41J 2/335; G03G 15/30
See application file for complete search history.

(56) References Cited

U.S. PATENT DOCUMENTS 3,994,053 A * 11/1976 Hunt .................... G03G 15/751
492/18
5,794,530 A * 8/1998 Dobashi .................. B41J 2/325
101/409

(Continued)

FOREIGN PATENT DOCUMENTS

| CN | 202003141 U | 10/2011 |
| JP | 02-79304 | 3/1990 |
| JP | 2002-110316 | 4/2002 |

OTHER PUBLICATIONS

International Search Report dated Apr. 5, 2019 for International Application No. PCT/US2018/066194, 2 pages.

*Primary Examiner* — Jason S Uhlenhake

(57) ABSTRACT

A drum for processing a thermal image medium has first and second end plates that extend orthogonally to an axis of rotation and enclose an inner core. First and second inner partitions along the axis define a first end zone between the first partition and the first end plate, a second end zone between the second partition and the second end plate, and a middle zone between the first and second partitions. Each inner partition has sleeve portions that extend outward from the partition, in an axial direction. A first lamp heater extends parallel to the axis and through one or more sleeve portions and has a first filament within the first end zone and a second filament within the second end zone. A second lamp heater extends parallel to the axis and through one or more sleeve portions and has a central filament within the middle zone.

26 Claims, 39 Drawing Sheets

(51) Int. Cl.
    *G03C 1/494*     (2006.01)
    *G03C 8/40*     (2006.01)
    *H05B 3/00*     (2006.01)

(56) References Cited

U.S. PATENT DOCUMENTS

| | | | |
|---|---|---|---|
| 6,252,653 | B1 | 6/2001 | Burgess et al. |
| 7,317,468 | B2 | 1/2008 | Struble et al. |
| 9,195,185 | B1 | 11/2015 | Struble et al. |
| 2006/0289418 | A1 | 12/2006 | Konishi et al. |
| 2013/0108300 | A1* | 5/2013 | Fujii .................. G03G 15/2042 399/69 |

* cited by examiner

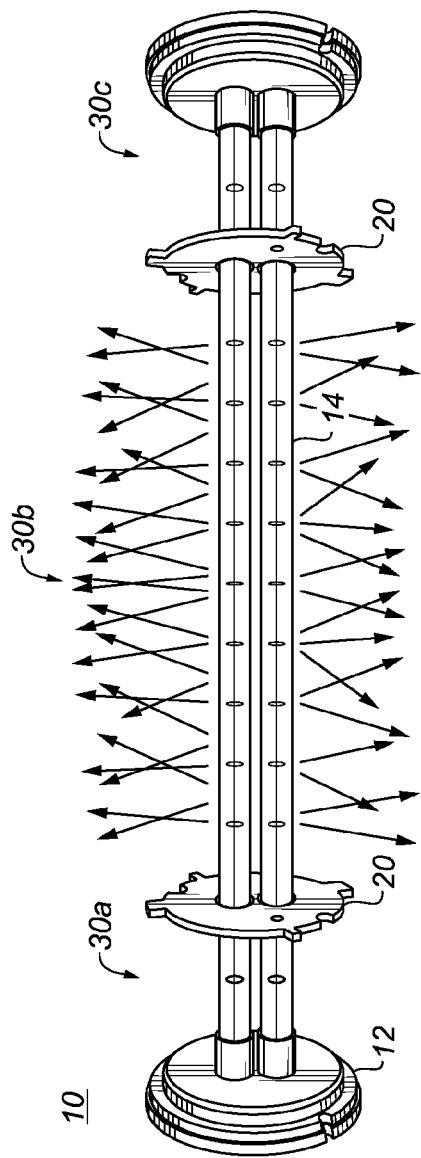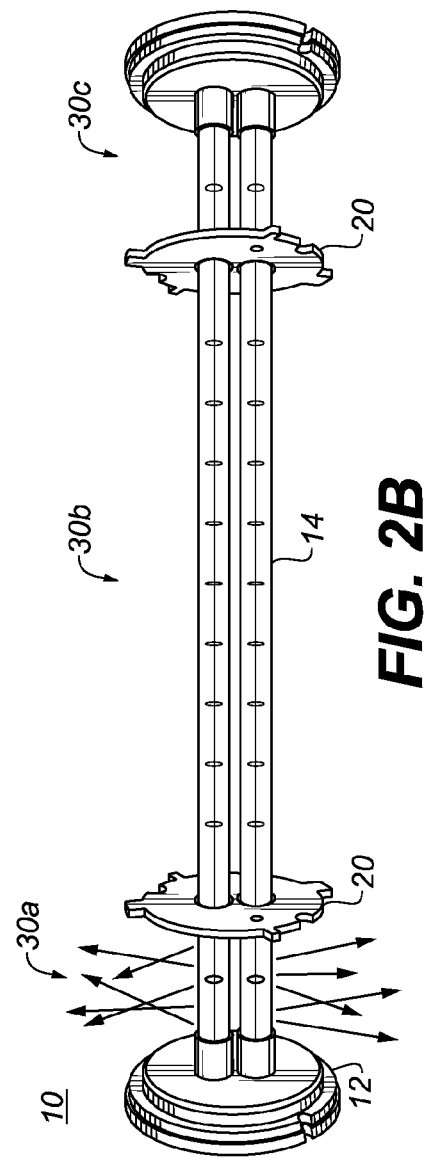
FIG. 2A
FIG. 2B

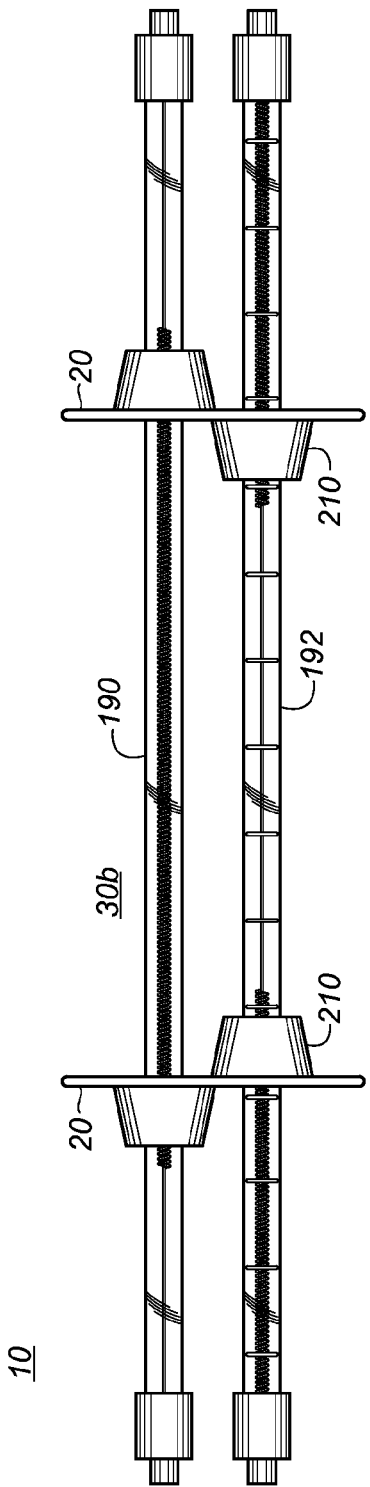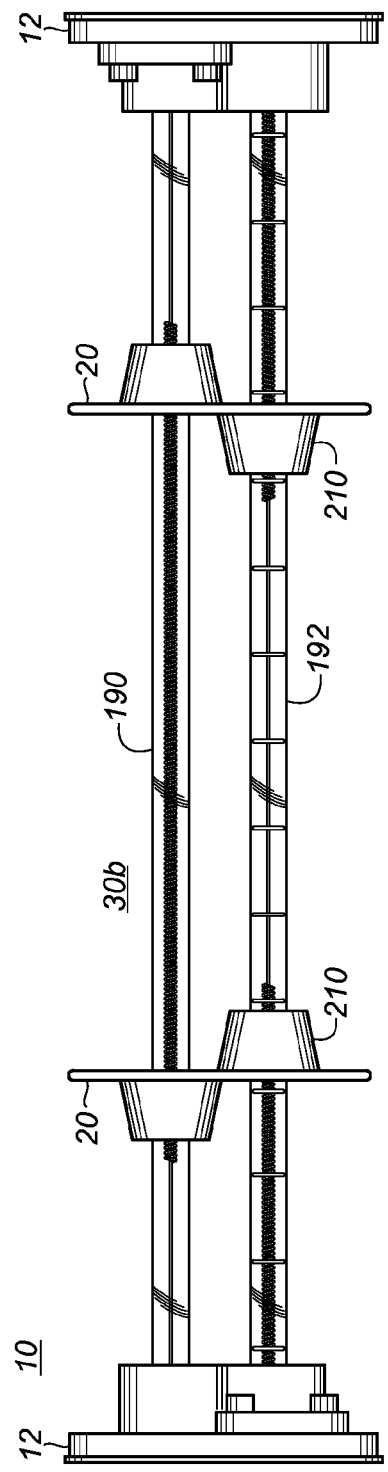

THERMAL PROCESSING DRUM

CROSS REFERENCE TO RELATED APPLICATIONS

This application claims the benefit of and is a U.S. National Phase filing of PCT Application PCT/US2018/066194 filed Dec. 18, 2018 entitled "THERMAL PROCESSING DRUM", in the name of Struble et al., which claims benefit of U.S. Patent Application Ser. No. 62/609,510, filed Dec. 22, 2017, in the name of Struble et al., and entitled THERMAL PROCESSING DRUM HAVING MULTIPLE HEAT ZONES, and which claims benefit of U.S. Patent Application Ser. No. 62/643,070 filed Mar. 14, 2018, in the name of Struble et al. and entitled THERMAL PROCESSING DRUM HAVING MULTIPLE LAMPS.

TECHNICAL FIELD

The disclosure relates generally to an apparatus and method for processing an imaging material, and more specifically to an apparatus and method for thermally developing an imaging material employing at least one drum thermal processor.

BACKGROUND

Photothermographic film and thermal processing of such films is known. See for example U.S. Pat. No. 9,195,185 (Struble) and U.S. Pat. No. 7,317,468 (Struble), both of which are incorporated herein in their entirety.

Reference is made to US 2006/0289418 (Konishi), incorporated herein by reference in its entirety. Konishi is directed to an infrared ray lamp, heating devices, and electronic device.

Photothermographic film typically includes a thin base material, such as a polymer, which is coated on at least one side with an emulsion of photosensitive and heat sensitive materials. After the film has been subjected to photo stimulation to form a latent image in the emulsion, such as via a laser imager, for example, a thermal processor is employed to develop an image from the latent image through application of heat to the film. Typically, a thermal processor raises the base material and emulsion to an optimal development temperature at which a chemical reaction of the emulsion occurs at an optimal rate. The thermal processor then maintains the film at the optimal development temperature for a required development duration to develop the image from the latent image.

One type of thermal processor is a drum processor. Drum processors typically employ a rotating heated drum having a series of rollers positioned about a segment of the drum's surface. Such rollers are sometimes referred to as "pressure rollers" and are biased against the drum. During development, rotation of the drum draws the photothermographic film between the pressure rollers and the drum, with the pressure rollers holding the photographic film against the drum so that heat is efficiently and evenly transferred from the drum to the photothermographic film.

In order to improve media throughput (i.e. the amount of imaging media that can be processed in a given time period), thermal processors typically raise the temperature of the photothermographic film to the development temperature as quickly as possible. Some types of thermal processors also quickly raise the temperature to the development temperature to ensure that chemical reactions in the emulsion proceed correctly (e.g. to ensure uniform development and a full range of optical densities). The size (i.e. diameter) of the drum is dependent on how quickly the film reaches the development temperature, the development duration of the photothermographic film, and the desired throughput of the thermal processor. Achieving an increase in throughput for a given type of photothermographic film having a given development temperature and a given development duration typically requires an increase in the drum's diameter.

There is a need for a thermal processor for providing sufficient, efficient, and/or appropriate heating of the photothermographic film without sacrificing film throughput.

SUMMARY

Certain embodiments described herein address the need for a thermal processor for providing sufficient, efficient, and/or appropriate heating of the photothermographic film without sacrificing film throughput. An object of interest is maintaining a uniform surface temperature of a thermal drum or roller during film processing.

These aspects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the disclosure, there is provided a cylindrical drum for processing a thermal image medium, the drum having an axis of rotation and comprising: first and second end plates that each extend orthogonally to the axis of rotation and enclose an inner core of the drum; first and second inner partitions disposed along the axis of rotation, and defining a first end zone in the inner core lying between the first partition and the first end plate, a second end zone in the inner core lying between the second partition and the second end plate, and a middle zone in the inner core lying between the first and second partitions, wherein each of the inner partitions has a plurality of sleeve portions that extend outward from the partition, in an axial direction; a first lamp heater extending parallel to the axis and through one or more sleeve portions and having a first filament disposed within the first end zone and a second filament disposed within the second end zone; a second lamp heater extending parallel to the axis and through one or more sleeve portions and having a central filament disposed within the middle zone.

According to one aspect of the disclosure, there is provided cylindrical drum for processing a thermal image medium, the drum having an axis of rotation and comprising: first and second end plates that each extend orthogonally to the axis of rotation and enclose an inner core of the drum; first, second, and third lamp heaters, each within the core and each extending in the direction of the axis of rotation, wherein the first lamp heater heats a first heat zone within the core, the second lamp heater heats a second heat zone within the core, the third lamp heater heats a third heat zone within the core; and at least one partition that defines a boundary between the first and the second heat zones within the core, the partition extending orthogonally to the axis of rotation.

BRIEF DESCRIPTION OF THE DRAWINGS

The foregoing and other objects, features, and advantages of the invention will be apparent from the following more particular description of the embodiments of the invention.

FIGS. 2A and 2B show a drum according to the present disclosure having three lamp heaters, three heat zones, and two partitions.

FIGS. 26A-26B show an exemplary embodiment having two partitions, each including two cone-shaped sleeve portions.

DETAILED DESCRIPTION OF EXEMPLARY EMBODIMENTS

Figure 1:
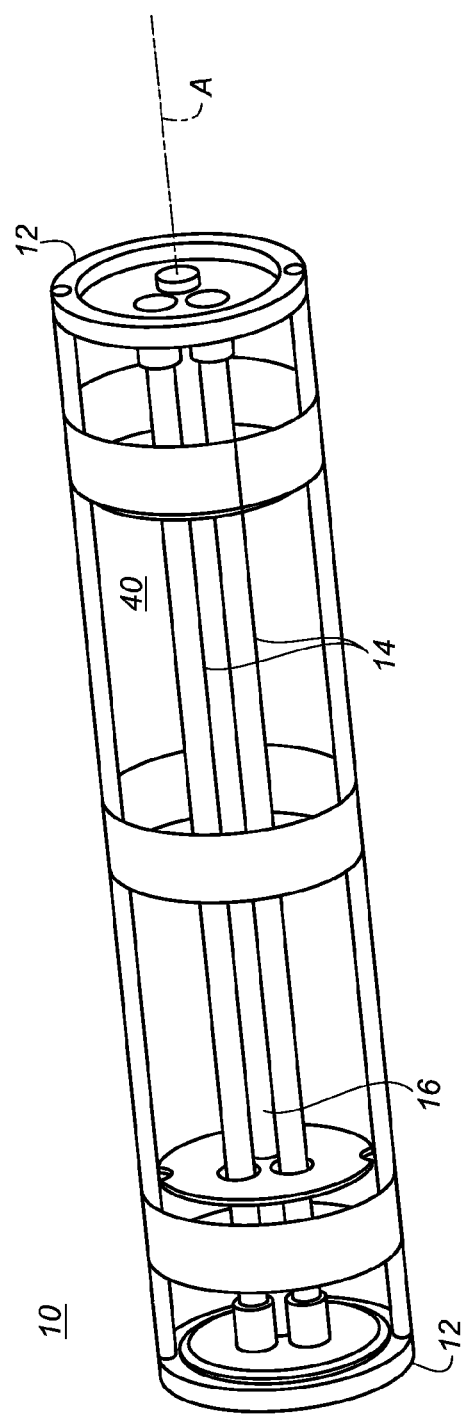
FIG. 1 shows a drum according to the present disclosure having three lamp heaters.

This application claims priority to U.S. Provisional application U.S. Ser. No. 62/609,510 provisionally filed on Dec. 22, 2017, entitled "THERMAL PROCESSING DRUM HAVING MULTIPLE HEAT ZONES", in the names of Kent R. Struble, Joel C. Marsh, and Daniel J. Peick, incorporated herein in its entirety.

This application claims priority to U.S. Provisional application U.S. Ser. No. 62/643,070 provisionally filed on Mar. 14, 2018, entitled "THERMAL PROCESSING DRUM HAVING MULTIPLE LAMPS", in the names of Kent R. Struble, Joel C. Marsh, and Daniel J. Peick, incorporated herein in its entirety.

The following is a detailed description of the preferred embodiments, reference being made to the drawings in which the same reference numerals identify the same elements of structure in each of the several figures.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

Blanket heaters are known. A blanket heater is comprised of multiple layers of silicone rubber and etched metal layer. Electric current is passed through the etched metal layer to produce heat. Blanket heaters are reliable and can be configured to apply more heat in some areas. A blanket heater may have one or more separate zones, each with its own temperature sensor and heating element.

Lamp heaters are known. The infrared energy from the lamp reflects multiple times around the inside of the drum before being completely absorbed as heat, effectively spreading the heat energy throughout the drum.

Practitioners have not been able to employ lamp heaters for multiple zone drums due to the difficulty of applying heat selectively on the inside drum surface. The infrared energy from the lamp reflects multiple times around the inside of the drum before being completely absorbed as heat, effectively spreading the heat energy throughout the drum.

While some drums focus on generating heat uniformly, the present disclosure is directed to a drum wherein the surface of the drum is uniform in temperature. This is accomplished by reflecting energy multiple times (e.g., high reflectivity) so as to provide a uniform absorption. Reflective partitions within the drum confine the energy and help to provide increased control of drum surface temperature during media handling and printing.

The processing drum of the present disclosure uses a plurality of lamp heaters within the drum. The glass tube of each lamp heater can run the full length of the drum, along the axial direction, the drum having an arrangement of heat zones. Within each lamp heater, there is an active portion of filament. The active filament in each glass tube can correspond to any one of three zones: left end, center, right end. With this arrangement, a first lamp heater can serve for heating the active left zone. A second heater can have an active center zone. The third lamp heater can provide an active right-end zone.

Although the physical proximity of the active part of the filament to each heat zone helps to deliver the energy where desired, reflective partitions are added within the drum to promote/ensure that the bulk of generated infrared energy remains in the area of the drum corresponding to the position of the active filament.

The present disclosure describes a drum comprising a plurality of lamp heaters. Each lamp heater is enclosed within a glass tube. Each glass tube extends in the direction of the drum axis, with the active heater filament extending within the zone that is to be heated. Reflective partitions or inner panels, in the form of plates, generally flat plates, having circular surfaces extending orthogonally with respect to the drum axis of rotation, are provided to help contain the bulk of the heat energy within corresponding zones of the drum.

In the context of the present disclosure, the terms "lamp heater", "heater lamp", or simply "lamp" or "heater" can be used interchangeably unless otherwise specified.

In the context of the present disclosure, the terms "cylinder" or "cylindrical" describe the overall shape of a rotatable heated drum for printing and media handling. Typically, the drum is in the familiar shape of a right circular cylinder, having circular bases extended along parallel planes and having a central axis perpendicular to the bases. The drum cylinder can alternately be non-circular, having bases with closed shapes that are not circular. The central axis is generally coincident with the axis of rotation for the drum.

FIGS. 1-18 are directed to a first configuration and show inner portions of the drum 10, with the drum surface removed.

Referring to FIG. 1, interior components of a cylindrical drum 10 are shown. The outer surface of drum 10 is removed to allow visibility of heater components. Drum 10 of the present disclosure employs a number of lamps as heaters; the heater lamps are in the form of glass tubes 14 that provide the lamp heaters and that extend, substantially the full length of the drum 10, in parallel to a drum axis of rotation A. This arrangement, with lamp heating filaments spaced apart from the drum 10 surface, helps to keep the lamp wiring away from the radiant heat area against the drum surface. The active part of the filament in each glass tube 14 that provides the heat energy is dedicated to a particular heat zone. Drum 10 has an inner core 40 between two end plates 12 that each extend along planes perpendicular to axis A. One or more reflective partitions 20 and reflective inner surfaces of end plates 12 provide plate surfaces that define separate heat zones and constrain the radiant energy to the appropriate heat zone. The partitions 20 extend orthogonally with respect to axis of rotation A, extending outward toward the drum surface (not shown in FIG. 1).

FIGS. 2A and 2B show reflective partitions 20 in an arrangement that is suitable for use with the drum of FIG. 1. According to an embodiment of the present disclosure, a single lamp tube 14 can be dedicated to each of three heat zones, one for zone 30a, one for zone 30b, one for zone 30c. It is further recognized that each heated zone 30a, 30b, 30c can have a temperature sensor. Partitions 20 can be configured or held in place, for example, by a threaded rod 16 that runs the length of the drum (FIG. 1).

Figure 3:
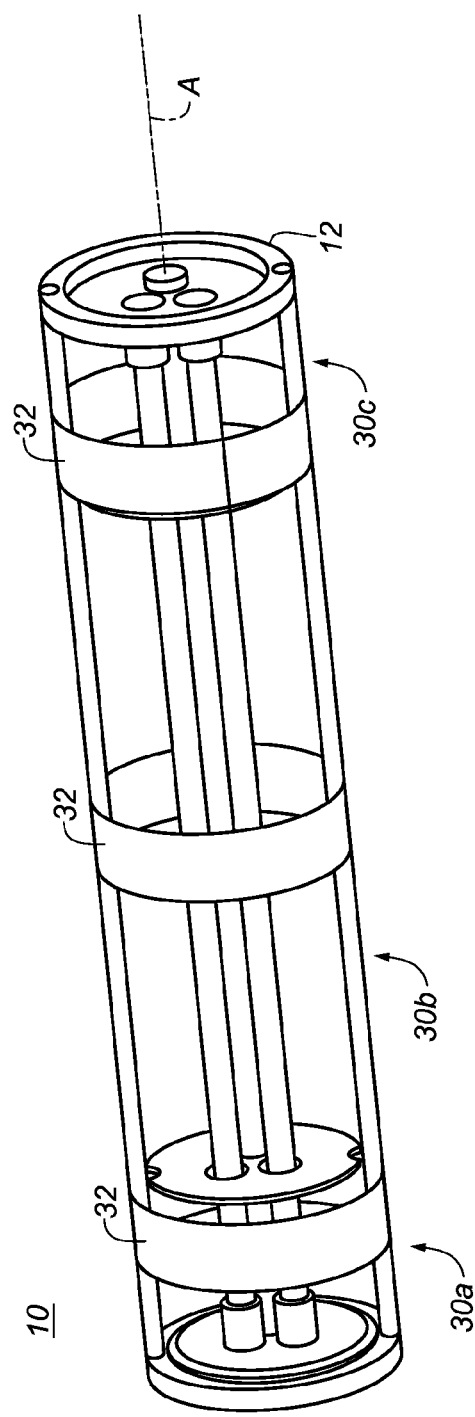
FIG. 3 shows a drum according to the present disclosure having three lamp heaters and three heat zones.
Figure 4:
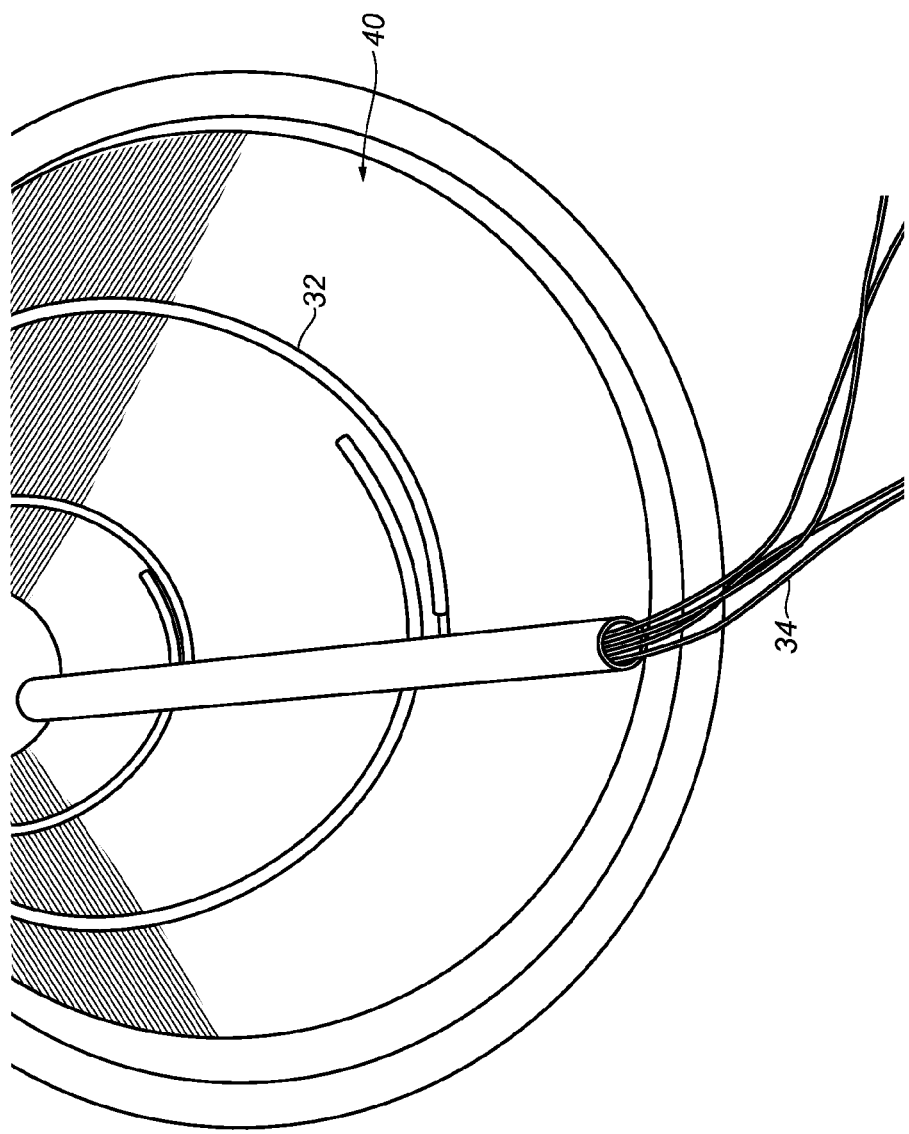
FIG. 4 shows an end view of the inner drum core.

Referring to FIGS. 3 and 4, for a three-zoned lamp heater, three sensors 32 are employed. All three sensors 32 can be of the same or different type. Sensors 32 may or may not have polarity for electrical connection. In one arrangement, all sensor wires 34 can be routed through inner core 40 of drum 10 and fitted through an end plate 12, with wire 34 routing as shown with end plate 12 removed in FIG. 4.

Figure 5:
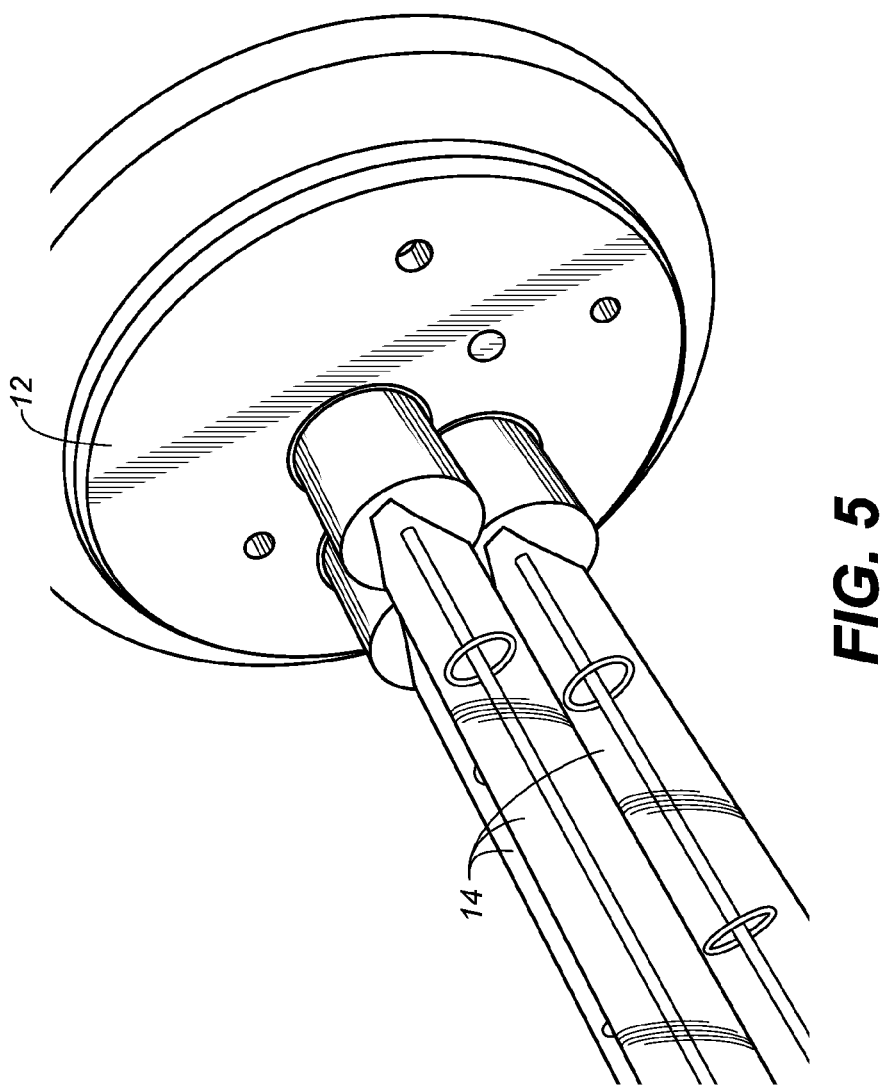
FIG. 5 shows a portion of a drum according to the present disclosure having three lamp heaters.
Figure 6:
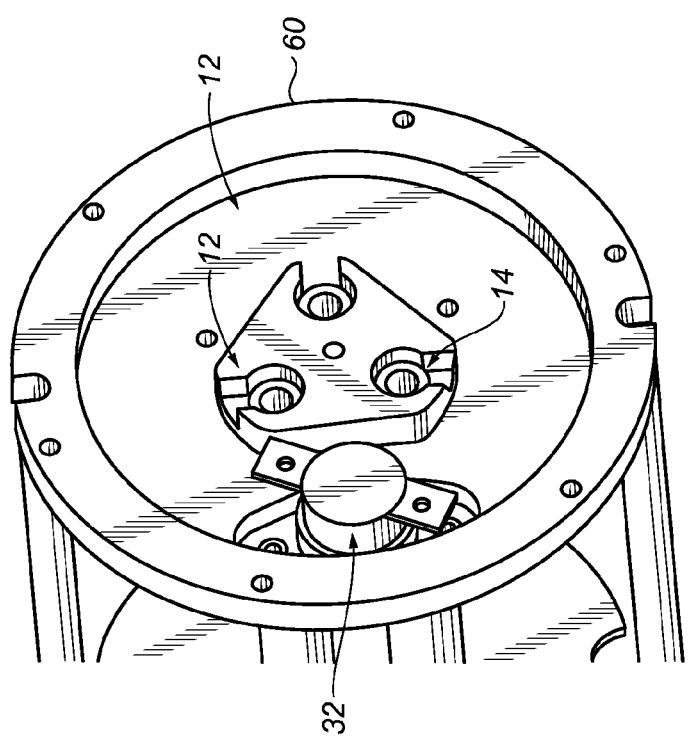
FIGS. 6-8 show views, configurations, and aspects of the heat shield.
Figure 7:
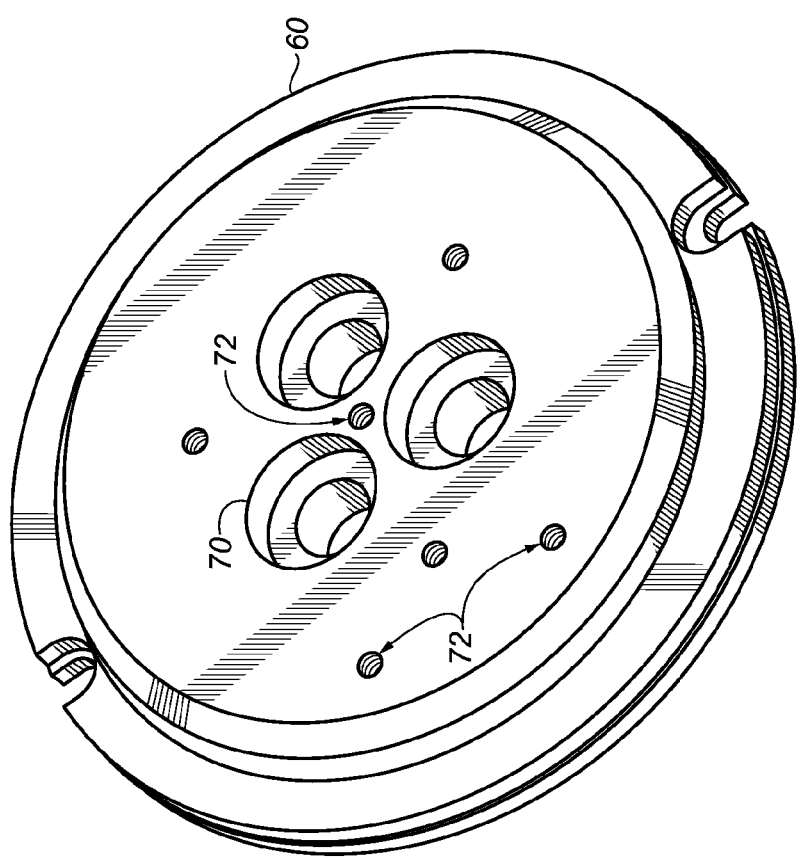
Figure 8:
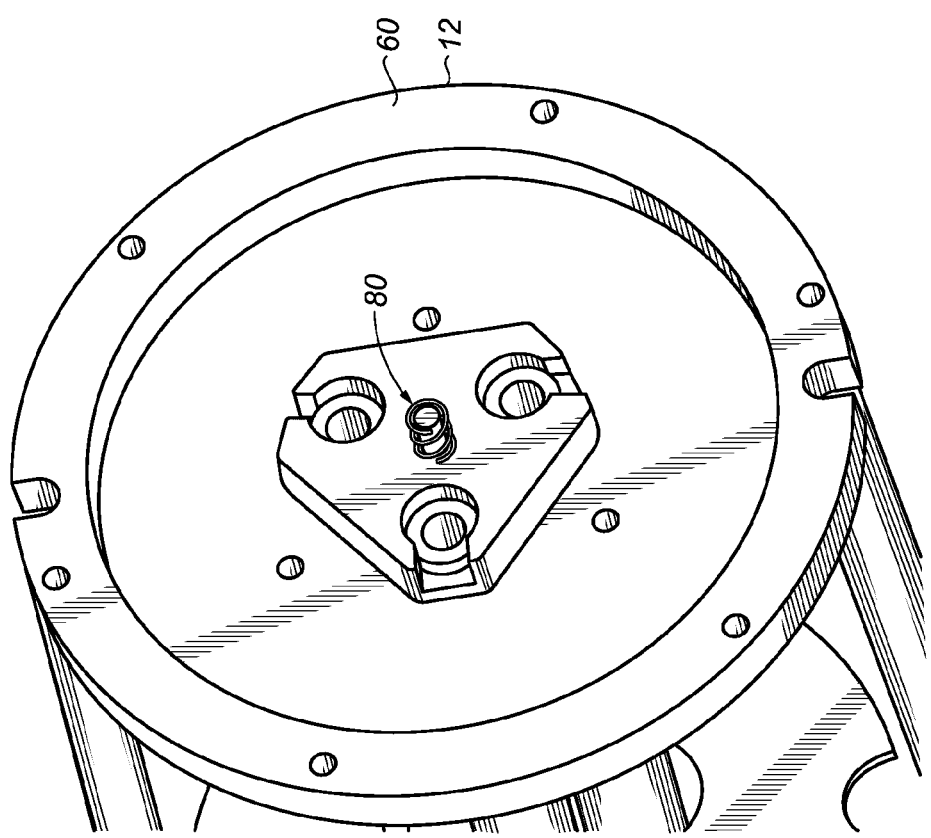

FIG. 5 shows the reflective inner surface of end plate 12. As illustrated in FIG. 5, lamp tubes 14 can be mounted off-center, with respect to the axis of rotation A. Applicants note that ceramic bulb ends can be prepared to prevent overheating, such as by wrapping with aluminum tape or providing some other type of heat shielding or heat sink device. FIGS. 6-8 provide other views, configurations, and aspects of a heat shield 60 formed on end plate 12.

FIG. 6 shows an embodiment of end plate 12, viewed from outside the drum, with notches and recess for wires. Sensor 32 can be a thermostat. Lamps or tubes 14 are sized to fit drum dimensions for lamp heaters.

FIG. 7 shows the inner surfaces on the opposite side of end plate 12 having recesses 70 for lamp ends and threaded holes 72 for mounting the thermostat or other sensor and a threaded hole 72 for the support rod 16.

FIG. 8 shows the inner surfaces of end plate 12 having a clearance hole and supporting spring 80 for support rod 16. Lamp wires can be connected to a terminal for a common return.

Figure 9:
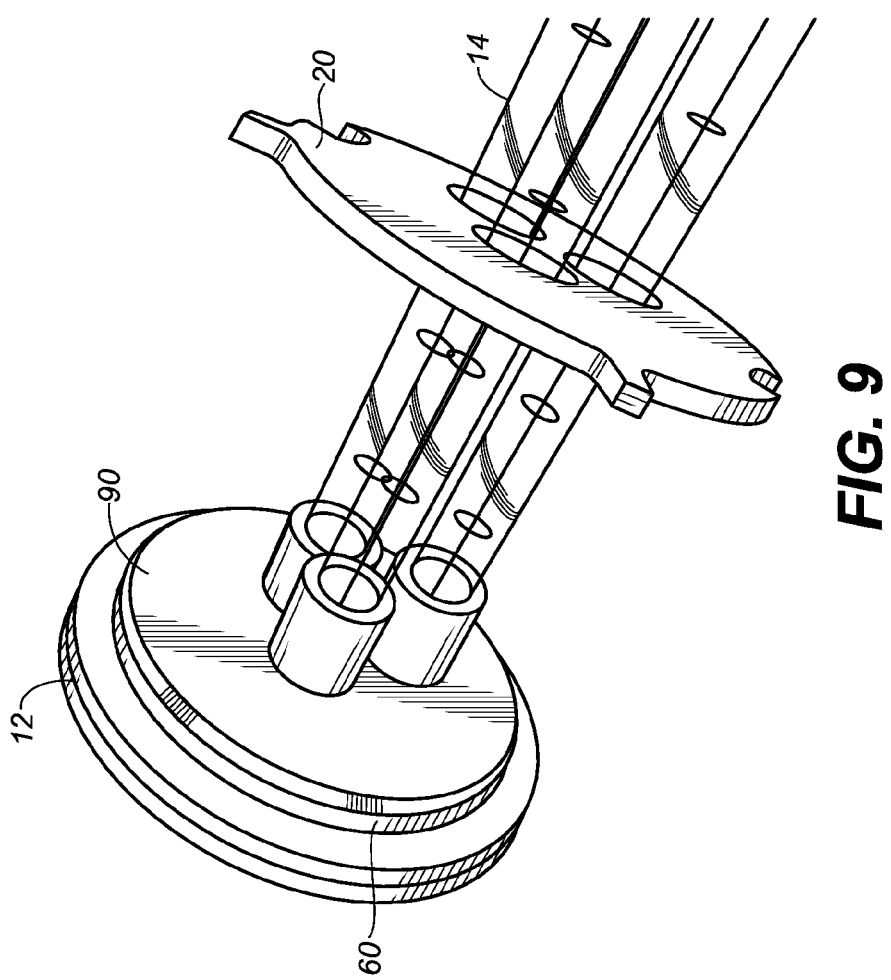
FIG. 9 shows a lamp prototype assembly of the drive side heat shield and partition.
Figure 10:
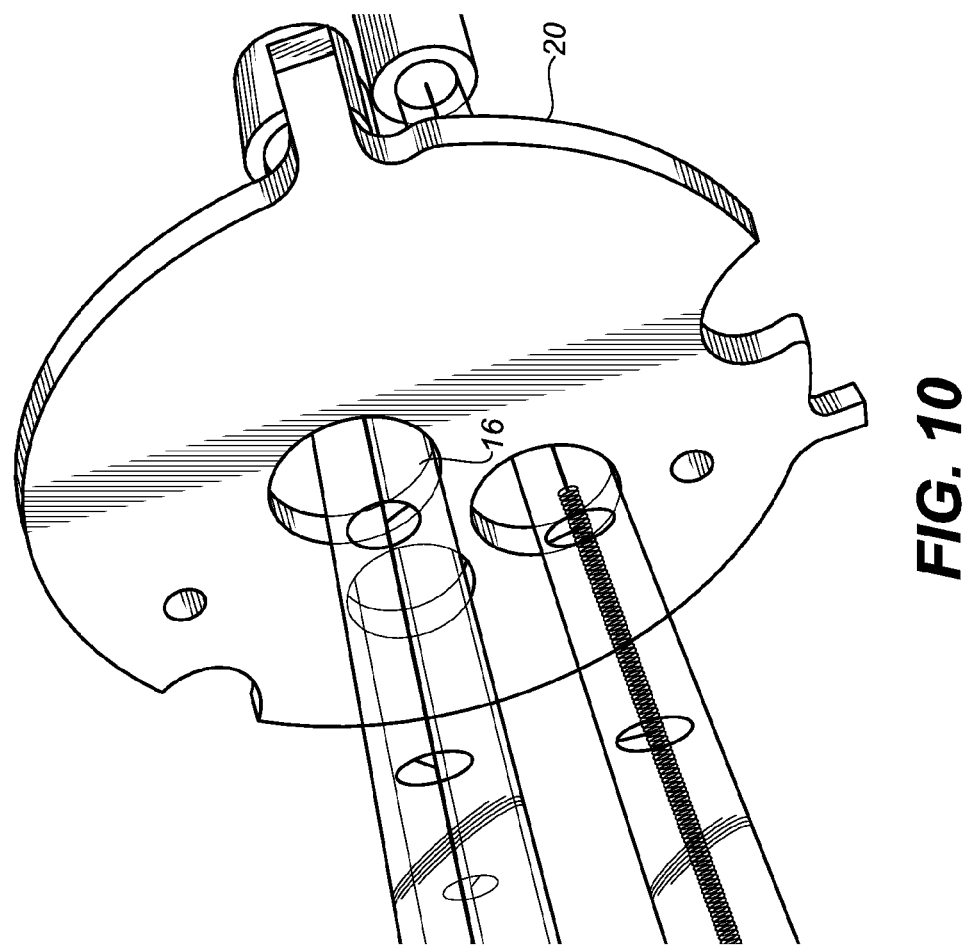
FIG. 10 shows a lamp prototype assembly of the non-drive side partition.

FIG. 9 illustrates assembly of the drive side end plate 12 with a heat shield 90 and partition 20. FIG. 10 illustrates assembly of the non-drive side partition 20. The lamp assembly that is thus constructed is then slid into the drum core 40. The non-drive heat shield is attached and threaded rod 16 is secured.

While the disclosure illustrates a drum with three lamp heaters, another/different number of lamp heaters can be employed, for example: two, four, or more.

As noted above, Applicants are using lamps to heat/warm a processing drum 10 with supporting reflective partitions to direct and consistently/uniformly contain the infrared energy generated within the core 40. Different types of heating lamps can be used. Embodiments illustrated in FIGS. 11 through 18 employ a tube lamp heater 110 that extends the length of the center zone, and also employ at least one end lamp heater 112, such as a halogen-filled lamp within each end zone. The lamp heater or heaters 112 within each end zone are in addition to the lamp heater 110 within the center zone. Lamp heater 112 can have a filament support 114 and arrangement of power wires 116 as shown.

Note that if the lamp heater 110 extends the full length of the drum 10, at least one lamp heater 112 can also be employed within each end zone 30. In a preferred arrangement, the lamp heaters 112 within the end zone 30a can be smaller than the lamp or lamp heaters 112 within the middle zone 30b. In an embodiment, all wiring is hidden, protected from the infrared energy. Lamp heaters 112 for the end zones which are rated for 130 V have been found to be suitable. In one embodiment, Applicants employ three lamp heaters 112 in series within each end zone 30a, 30c. In this arrangement, each lamp 112 is operated at 80 V when the imager is connected to 240 V. Applicants have recognized that running lamp heaters 112 as the end zone lamps on a reduced voltage lengthens the life of each lamp heater 112 as well as shifting the emitted output toward the infrared range.

Figure 11:
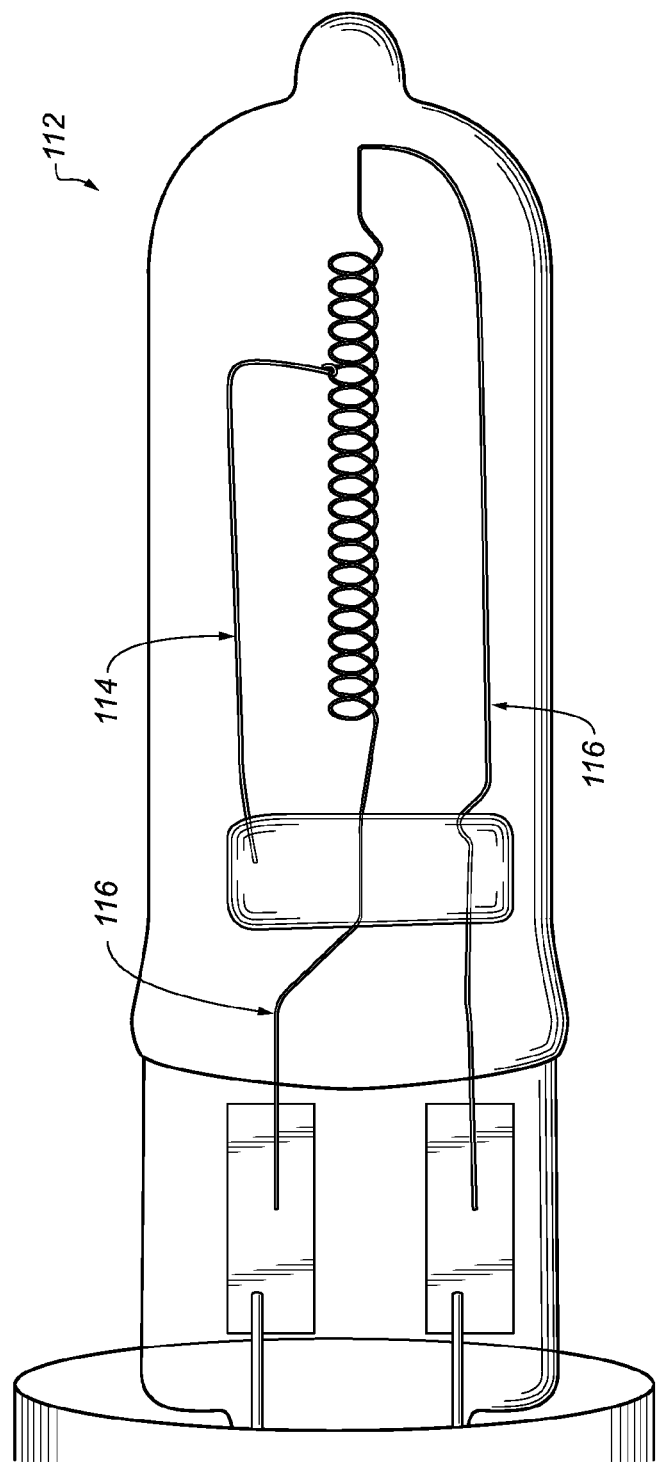
FIG. 11 shows an exemplary end zone lamp according to at least one embodiment of the disclosure.
Figure 12:
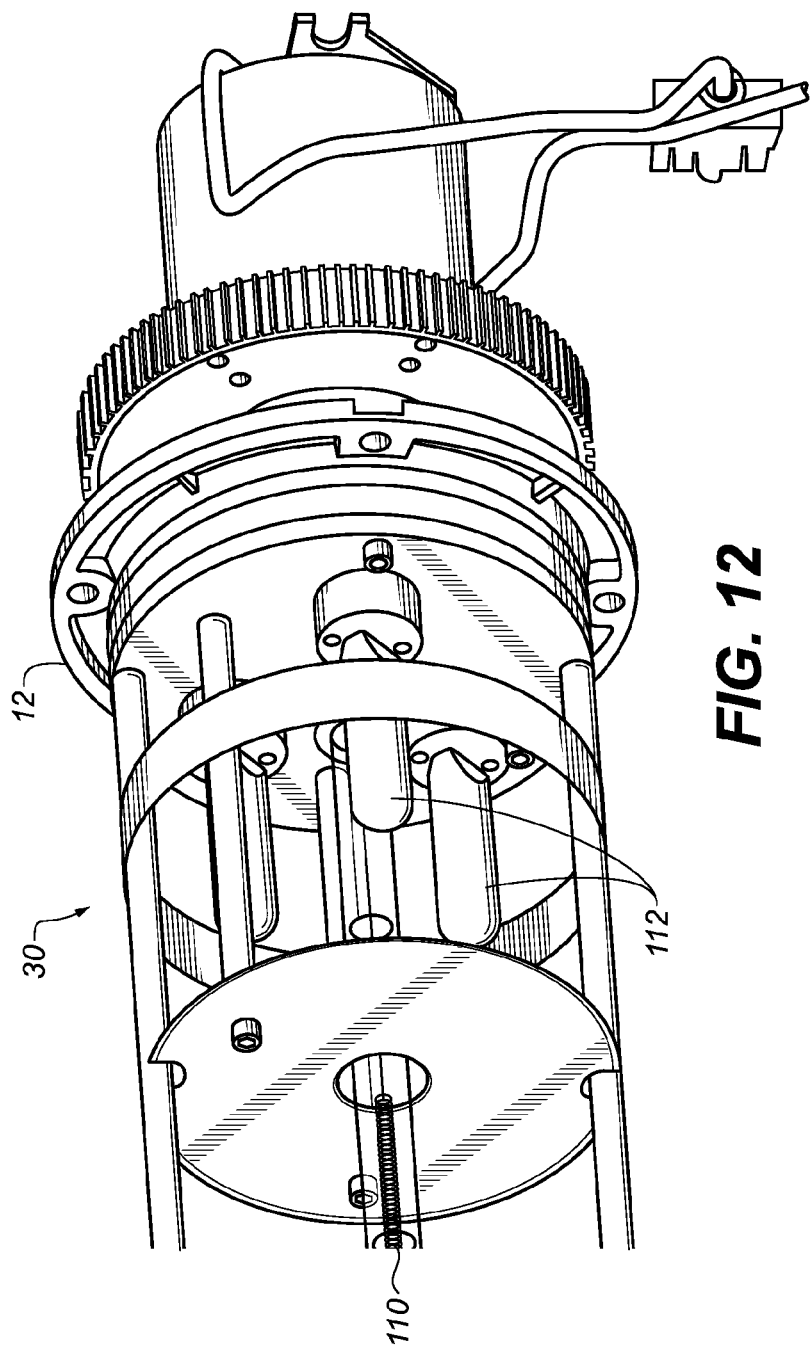
FIG. 12 illustrates the placement of a plurality of end zone lamps within an end zone area of the drum.
Figure 13:
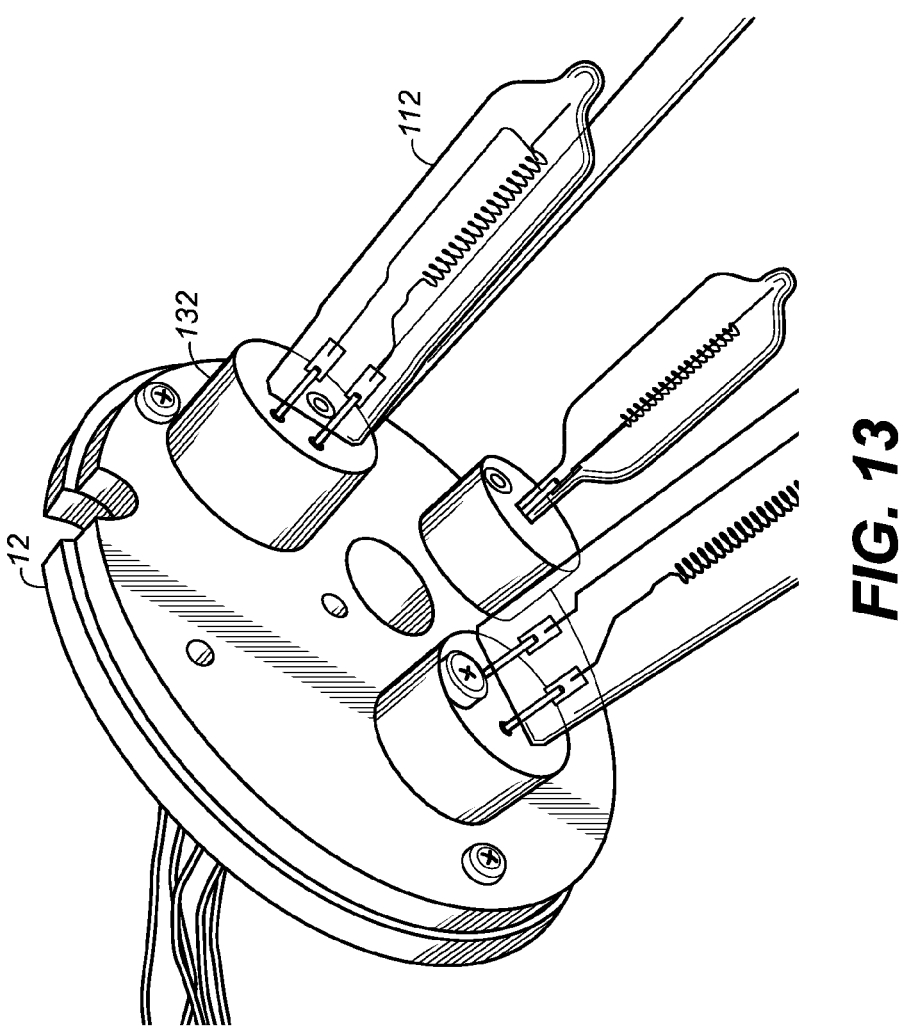
FIG. 13 shows mounted end zone lamps within a socket. As illustrated, a reflector is mounted around the socket.
Figure 14:
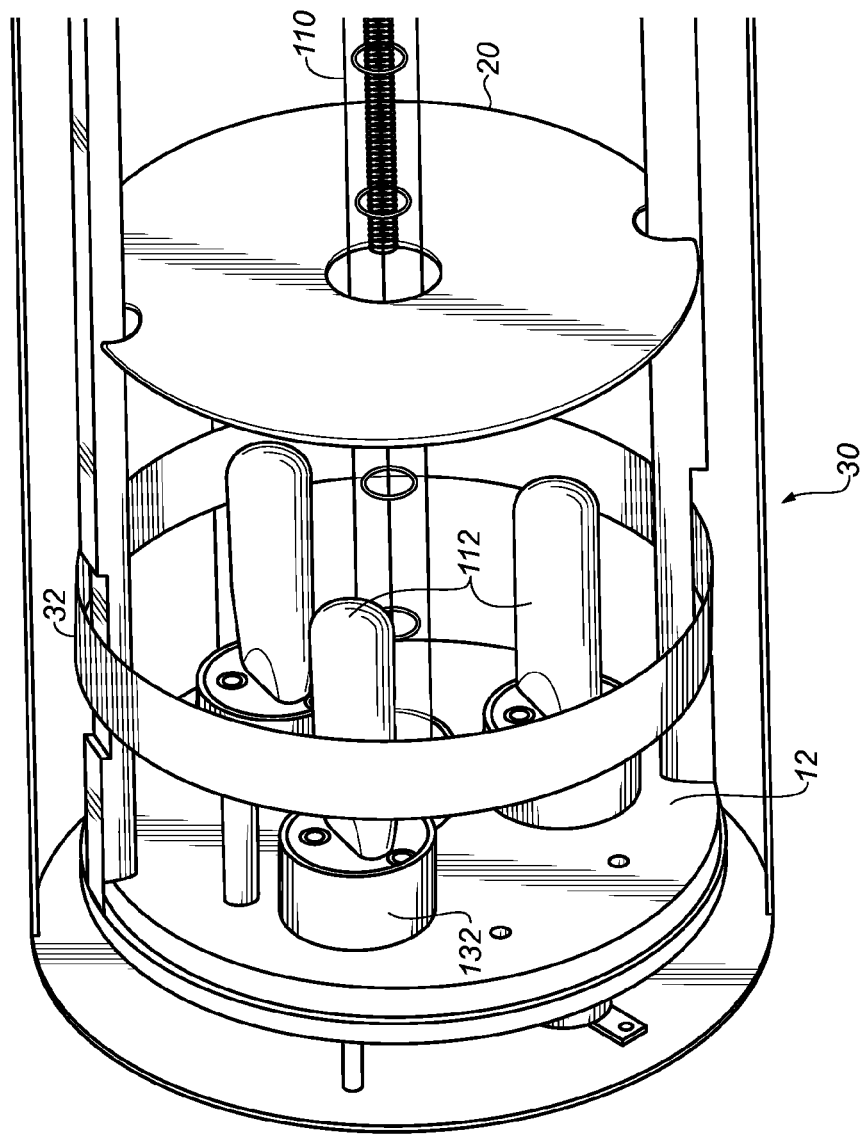
FIG. 14 shows one configuration for mounting, illustrated as a die cast end plate employing a socket.
Figure 15:
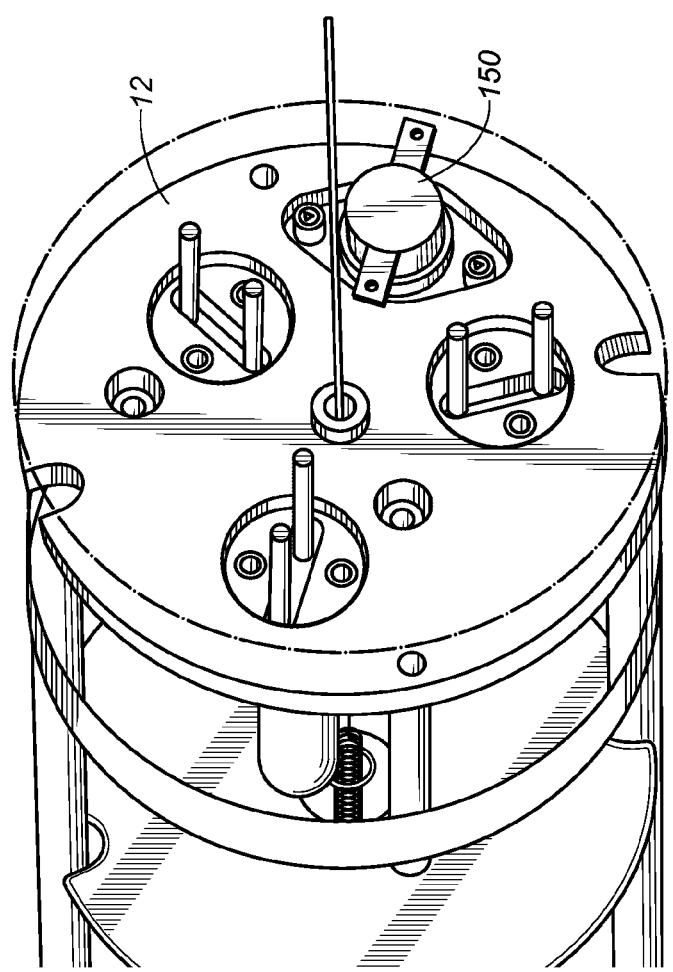
FIG. 15 shows the mounting of a thermostat, one at each end plate of the drum.
Figure 16:
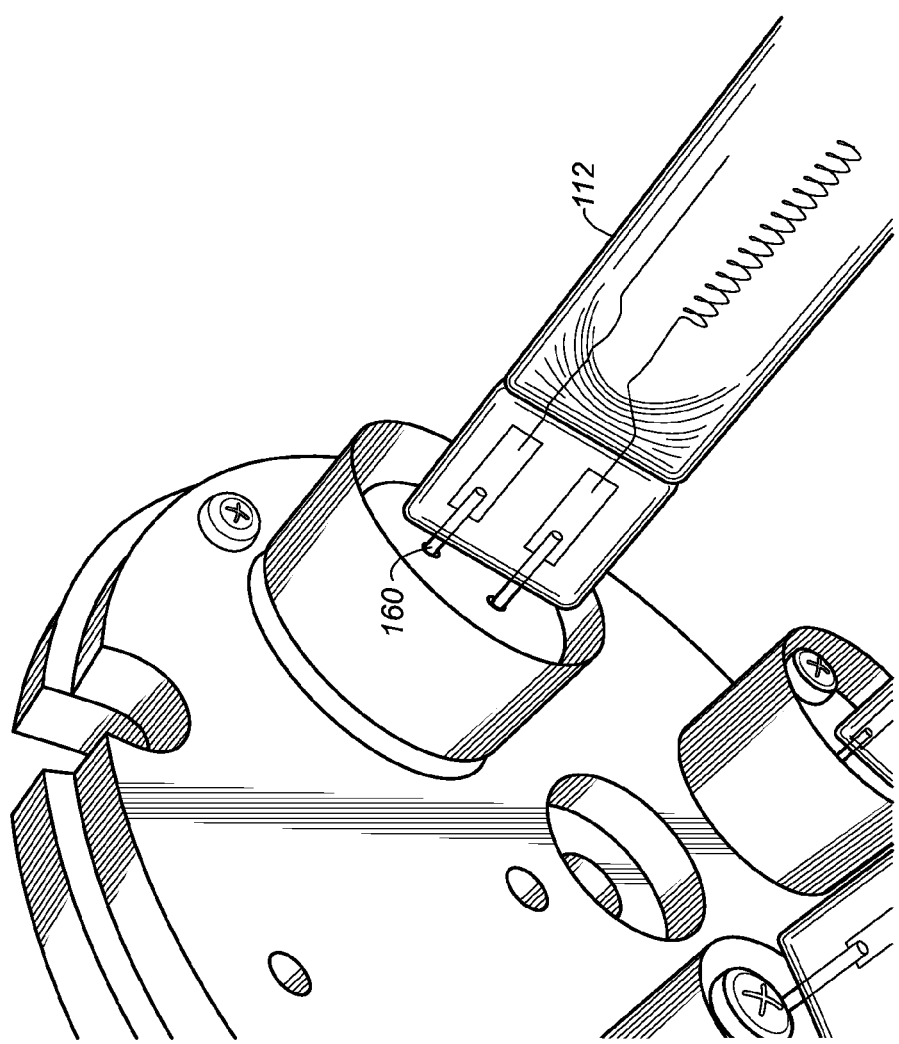
FIGS. 16-17 show a lamp supported on base wires.
Figure 17:
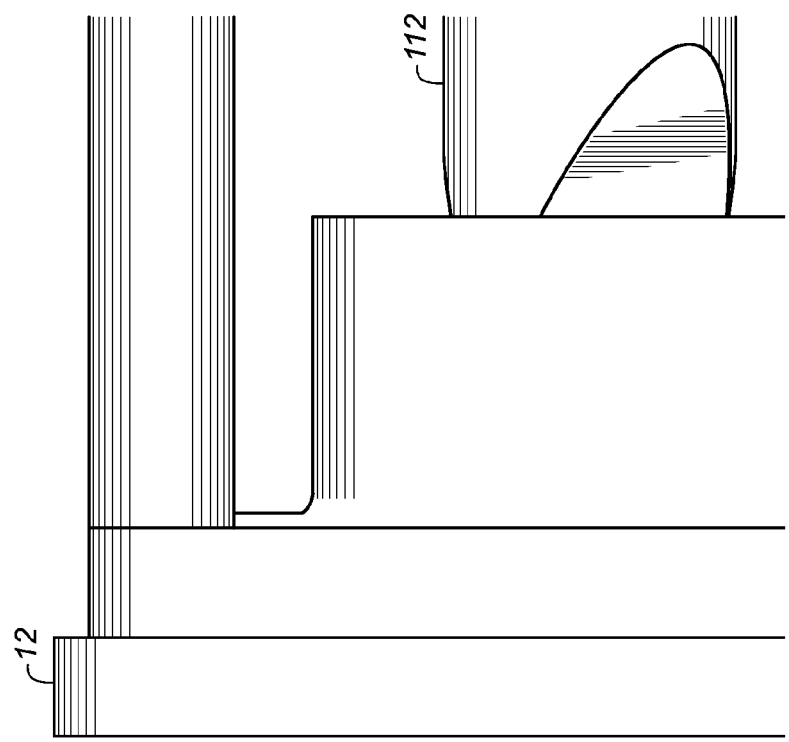

It is preferred that the lamp does not fail and/or that the lamp's glass not darken. FIG. 11 shows an exemplary end zone lamp heater 112. FIG. 12 illustrates the placement of a plurality of end zone lamp heaters 112 within an end zone 30 area of the drum. FIG. 13 shows mounted end zone lamp heaters 112 within a socket 132. As illustrated, a reflector is mounted around the socket. FIG. 14 shows one configuration for mounting, illustrated as a die cast end plate 12 employing a socket 132 that can be riveted in place. FIG. 15 shows the mounting of a thermostat 150 as a sensor; one thermostat 150 can be mounted at each end plate 12. FIGS. 16-17 show a lamp heater 112 supported on base wires 160.

Figure 18:
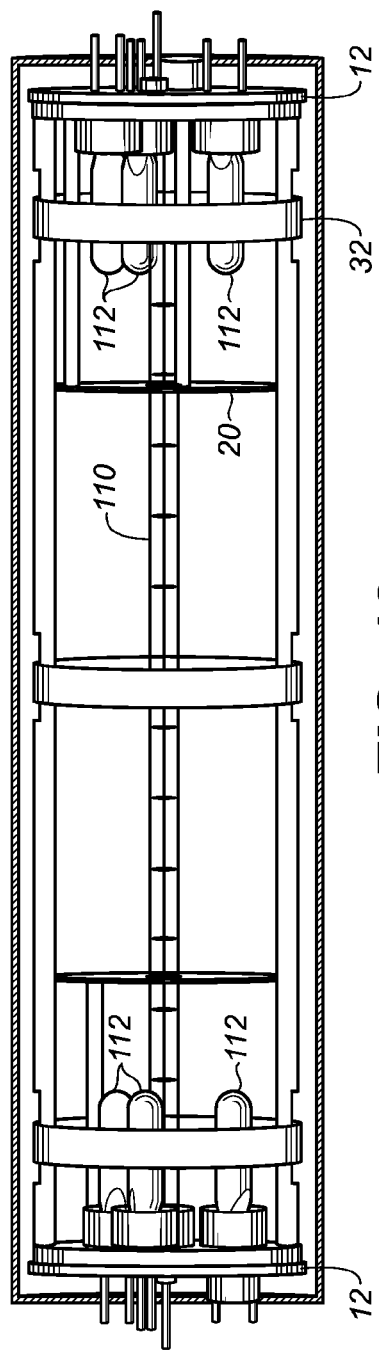
FIG. 18 shows an assembly having a plurality of lamps disposed within each end zone.

FIG. 18 shows a 3-zone, 240V embodiment of drum 10 having a plurality of lamps 112 disposed within each end zone. A single lamp heater 110 spans the length of drum 10.

FIGS. 19-38 more particularly describe a further configuration wherein two (2) lamps are employed as heaters.

Applicants have noted that when using a drum processor for thermal media handling and processing, end and middle portions of the drum 10 can have different characteristic thermal behavior. For example, the end sections/portions of the drum 10 typically lose heat more quickly during an idling phase (i.e., non-utility phase; when processing is not actually occurring) as compared to the middle section/portion of the drum 10. More particularly, outer ends of the drum lose heat more readily than the center of the drum during idle (non-printing) but the center of the drum loses heat faster to the film when printing.

As such, Applicants have recognized a benefit of a system that compensates for this behavior difference. In the Applicants' system, more heat is applied/available at outer ends of the drum 10 during the idling phase, such that when processing is initiated/activated, uniform heat is more quickly/readily obtainable/obtained across the length of the drum.

Applicants have recognized that, to perform the heating function and compensate for variable changes in the thermal profile, two lamp heaters can be employed; this allows the ability to compensate for changing thermal conditions, applying heat selectively over portions of the drum that need more or less heat depending on whether or not the printer/imager is printing.

Figure 19:
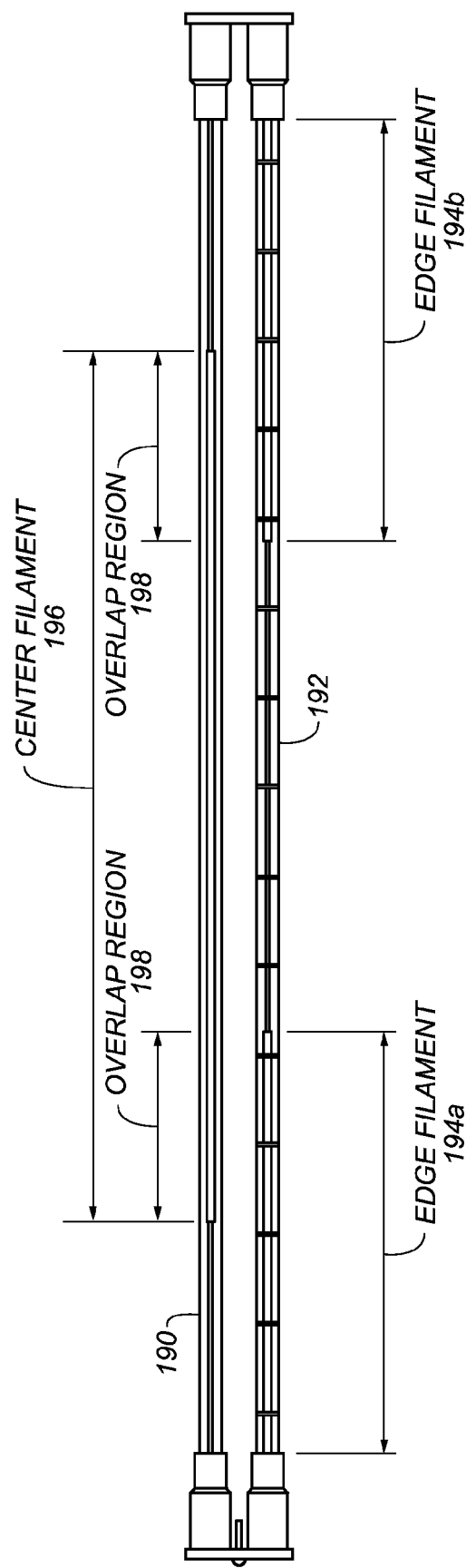
FIG. 19 shows a further configuration wherein two lamps are employed.

FIG. 19 shows a two-lamp heater configuration/design for heat sources within the drum core. One lamp heater 192 includes edge filaments 194a, 194b in each of the two outer end portions, while the other lamp heater 190 includes a center filament 196. As illustrated in FIG. 19, the edge filament 194a, 194b of one or both end portions can overlap a portion of a center filament 196. FIG. 19 labels two overlap regions 198 where this relationship of filaments occurs. From a side view, with respect to the axis of rotation the filaments for drum center and edges can have an amount of overlap.

In one arrangement, this overlap region 198 can be from 40 mm to 60 mm in length, wherein an approximate 48 mm overlap length may be preferred.

As illustrated, an overlap region 198 is where there is an area of overlap of an edge filament 194a, 194b region with a center filament 196 region.

Each of the two lamp heaters 190, 192 is preferably independently energizable or operable. With regard to lamp heater 192 with edge filaments 194a, 194b (i.e., left and right end zones), the edge filaments 194a, 194b or zones can be ganged/operated together, yet run independently of the lamp heater 190 having a center filament 196 for heating the center zone of the drum.

Figure 20:
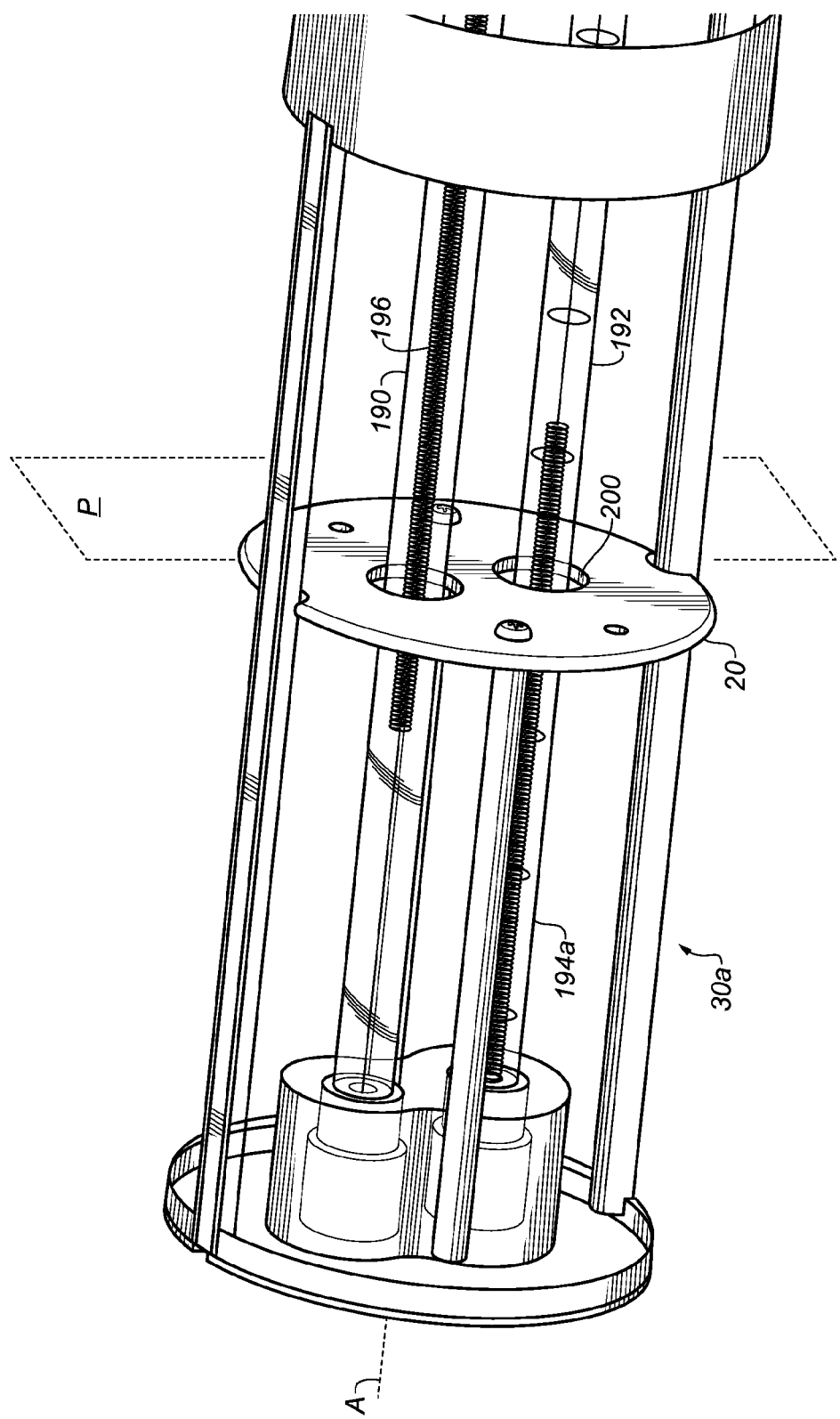
FIG. 20 shows a portion of the configuration of FIG. 19, illustrating a partition within an overlap region.

FIG. 20 shows a portion of the configuration of FIG. 19, illustrating a partition 20 disposed in one of the overlap regions. In the FIG. 20 example, the plane in which partition 20 lies intersects both filaments 196 and 194a. As illustrated, the partition 20 is shaped as a flat/planar circular/disc, extending along a plane P orthogonal to drum axis A. Partition 20 has a number of openings 200 or holes to allow lamp heater 190 having center filament 196 and lamp heater 192 having edge filaments to pass through. In a preferred arrangement, the partition 20 is formed of metal or other suitable non-flammable material, which may or may not be heat-conductive. For example, in one arrangement, the partition 20 acts as a heat shield, so as to retain heat within its respective heating zone 30a, 30b, or 30c.

Figure 21:
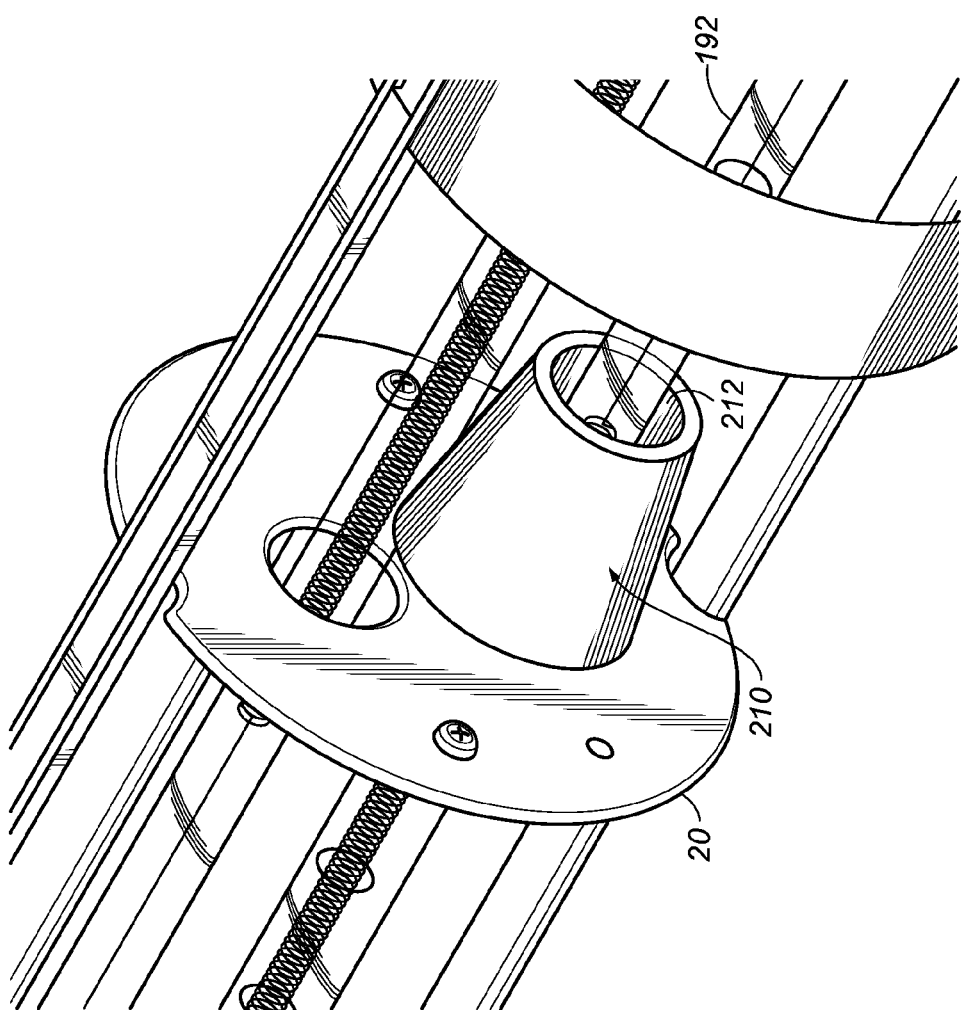
FIG. 21 shows a partition having a cone-shaped sleeve portion.

FIG. 21 shows a sleeve element or portion 210 attached to the partition 20 and extending outward in an axial direction. Sleeve element 210 includes an opening 212 through which a lamp with filament(s) (Center or Edge) extends. Sleeve element 210 can alternately include supporting hardware, wiring, or other means (known to those skilled in the art) to attach/support a lamp heater 192 and filament thereto.

Sleeve element 210 protrudes/extends from the surface of the partition 20 in a direction that is either towards or away from the center of the drum. In a preferred arrangement, the extending sleeve portion 210 is tapered and conical-shaped (conical; cone shaped) or cylindrical-shaped (i.e., having a constant radius) or has a conical or cylindrical segment. As illustrated in FIG. 21 and following, sleeve portion 210 is predominantly cone-shaped, having a tapered surface which is truncated. Alternatively described, sleeve portion or element 210 can have a cone- or tapered funnel-shape which is truncated at each end.

Applicants have recognized that the use of sleeve 210 with this geometric and positional configuration can support the lamp heater can promote retention of the heat within each respective zone, and can promote more gradual dissipation of the heat in the area near/adjacent the overlap region.

In an embodiment, the partition 20 and cone-shaped sleeve portion 210 are comprised of aluminum, which provides good heat conduction. Those skilled in the art would recognize other suitable materials and treatments, which may include; for example, nickel plating (promotes a durable and reflective surface). Such plating may limit the infrared energy absorption capability of sleeve portions 210 and their corresponding partitions 20.

Partition 20 and its sleeve elements 210 can be discrete components that are assembled as part of drum fabrication, or may be configured as a unitary component, such as formed as a metal casting, for example. Similarly, portions of sleeve 210 may be discrete components, or may be configured as a unitary component.

If configured as one (unitary) component/part, the heat absorbed into the cone-shaped sleeve portion 210 may be more readily conducted to the rest of the partition 20, limiting heat absorbed by the cone-shaped sleeve portion 210. If the sleeve 210 and partition 20 are fabricated as separate components, their combined thermal conduction may not be as favorable. On the other hand, if formed as separate components, sleeve 210 and portion 20 can be formed from different materials and can benefit from heat isolation and differences in thermal response. Use of different materials can be beneficial to reduce cost in some cases, particularly where more expensive metals such as titanium may be used.

Figure 22:
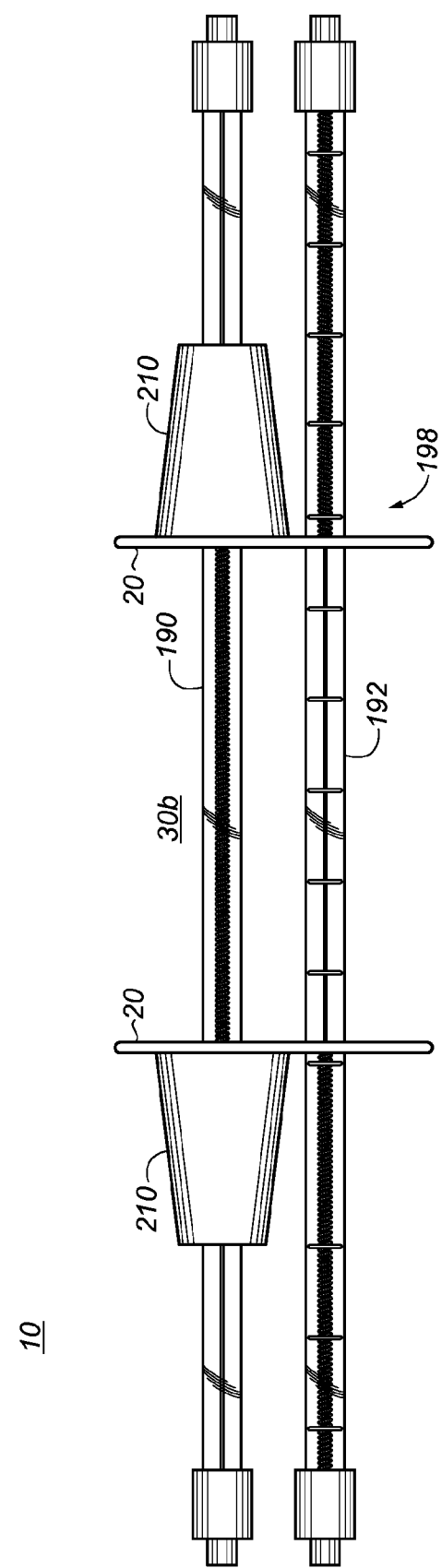
FIG. 22 shows a side view of a two-lamp configuration having two partitions disposed at/near/within an overlap region.

The side view of FIG. 22 shows a two-lamp configuration for heating, with two sleeve elements 210, each coupled to a partition 20 and disposed at/near/within an overlap region 198. As illustrated, each of the two sleeve elements 210 extend away from central zone 30b, extended toward opposite end plates 12 (not shown in FIG. 22). As illustrated, the sleeve portions 210 are cone-shaped, with the taper directed toward end plates 12 along outer portions of drum 10. At least one of the sleeve portions 210 can be disposed in or extended into an overlap region 198 wherein the first filament and central filament overlap with respect to the axis of rotation, as described previously with relation to FIG. 19.

Figure 23:
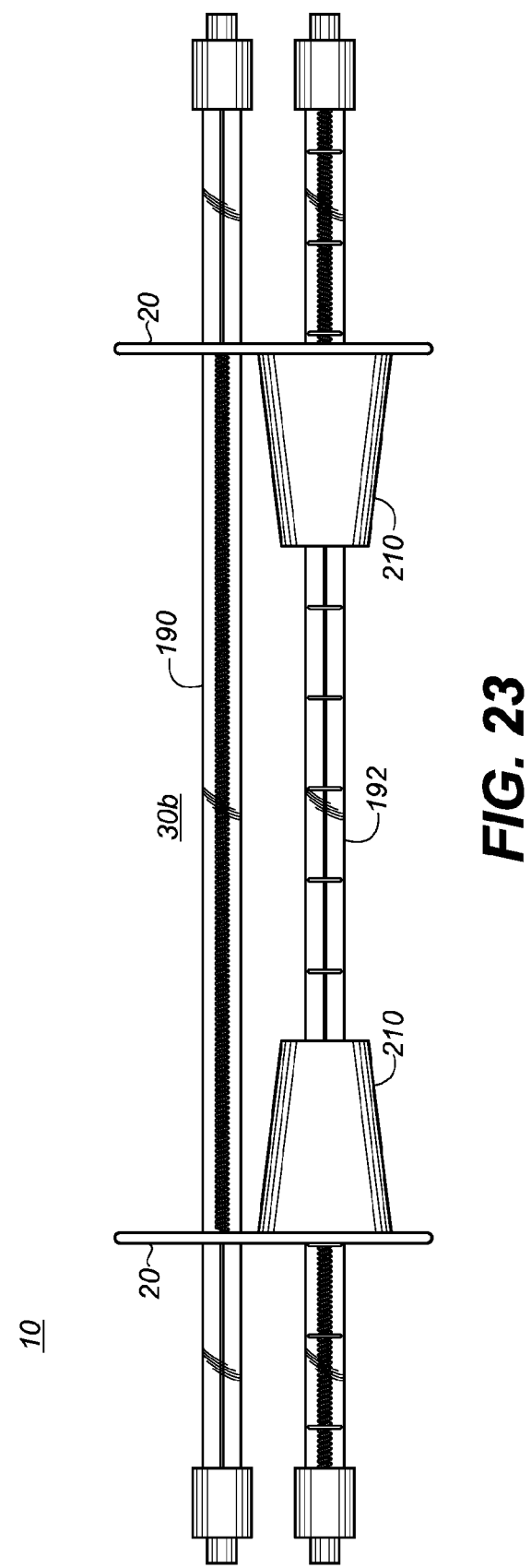
FIG. 23 shows a side view of another two-lamp configuration having two partitions disposed at/near/within an overlap region.

FIG. 23 shows a side view of a two-lamp heater configuration for heating, having two sleeve elements 210, each coupled to a partition 20 and disposed at/near/within an overlap region 198. As illustrated, each of the two sleeve elements 210 extend into central zone 30b, extending toward the center of drum 10. Again, the sleeve portions 210 are cone-shaped, but with the taper directed toward the drum center.

Other configurations/variations of the number, location, and position of sleeve elements 210 could be employed. For example, a single sleeve element 210 can be provided, coupled to a partition 20 disposed at/near/within an overlap region, wherein the sleeve element/portion 210 is cone-shaped and disposed on an outside surface with the taper facing an end of the lamp. Another example: a single sleeve element 210 coupled to a partition disposed at/near/within an overlap region, wherein the sleeve element 210 is tapered and disposed on an inside surface with the taper facing toward the center of the drum. A further example: one partition 20 disposed at/near/within an overlap region having two sleeve elements 210 attached thereto, each sleeve element 210 being cone-shaped, wherein one sleeve element 210 is disposed on an inside surface with the taper facing toward the center of the drum and the other element is disposed on an outside surface with the taper facing away from the center of the drum.

Figure 24:
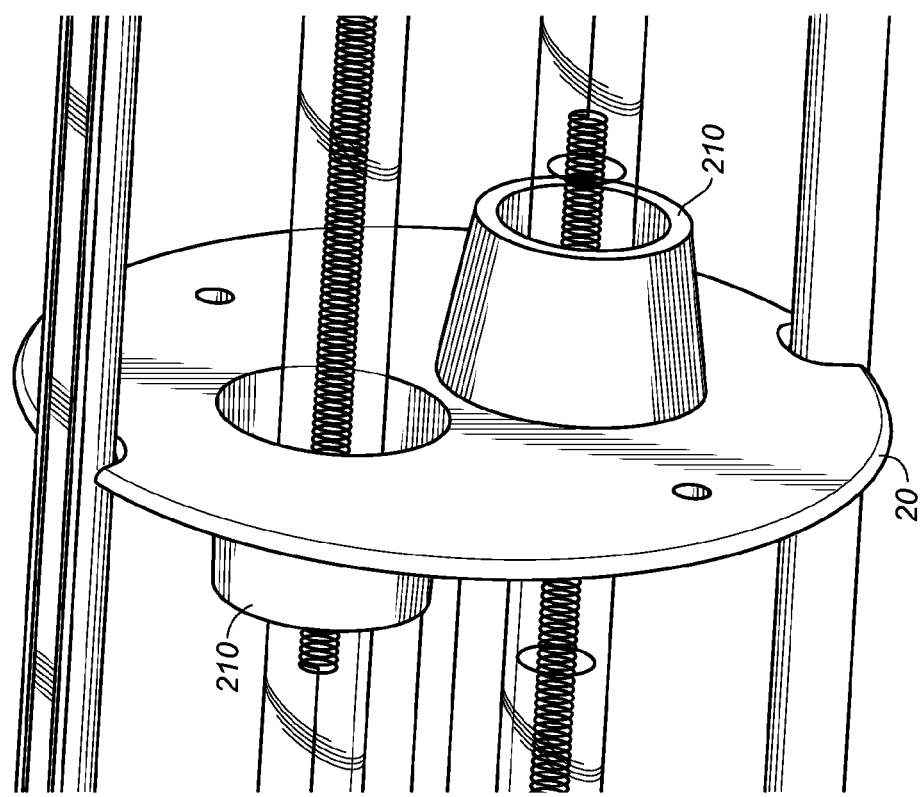
FIG. 24 shows an isometric view of two cone-shaped sleeve portions attached to one partition.

FIG. 24 shows an isometric view of two sleeve elements 210 attached to one partition 20 disposed within the overlap region. Each sleeve element 210 includes a cone-shaped portion with an opening therethrough. As illustrated, one sleeve element 210 is disposed on each side of the partition 20 with respect to the drum axis. One sleeve element 210 sleeve element 210 is disposed on one surface of the partition 20 with the cone-shape facing toward the center of the lamp or drum 10 and the other sleeve element 210 is disposed on the other surface of the partition 20 with the tapered end facing away from the center of the drum. Illustrative arrows are directed at the cone-shaped sleeve elements 210.

Figure 25:
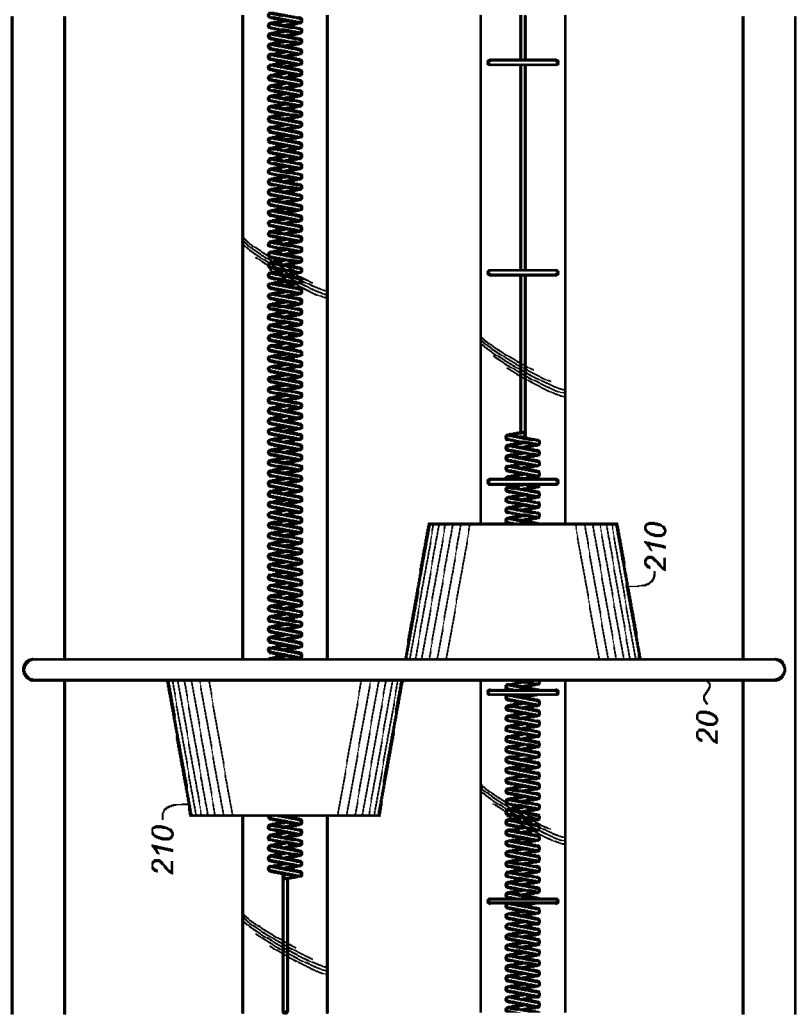
FIG. 25 shows a side view of FIG. 24.

FIG. 25 shows a side view of FIG. 24.

FIGS. 26A-26B show a further example employing two partitions 20, wherein each of the partitions 20 is disposed within an overlap region, and each includes a pair of sleeve elements 210 attached thereto. Each sleeve element 210 is cone-shaped, wherein one sleeve element 210 of each pair is disposed on an inside surface with the taper facing toward the center of the drum and the other element is disposed on an outside surface with the taper facing away from the center of the drum. FIG. 26B shows the two lamp heaters 190, 192 of FIG. 26A within end plates 12.

Figure 27:
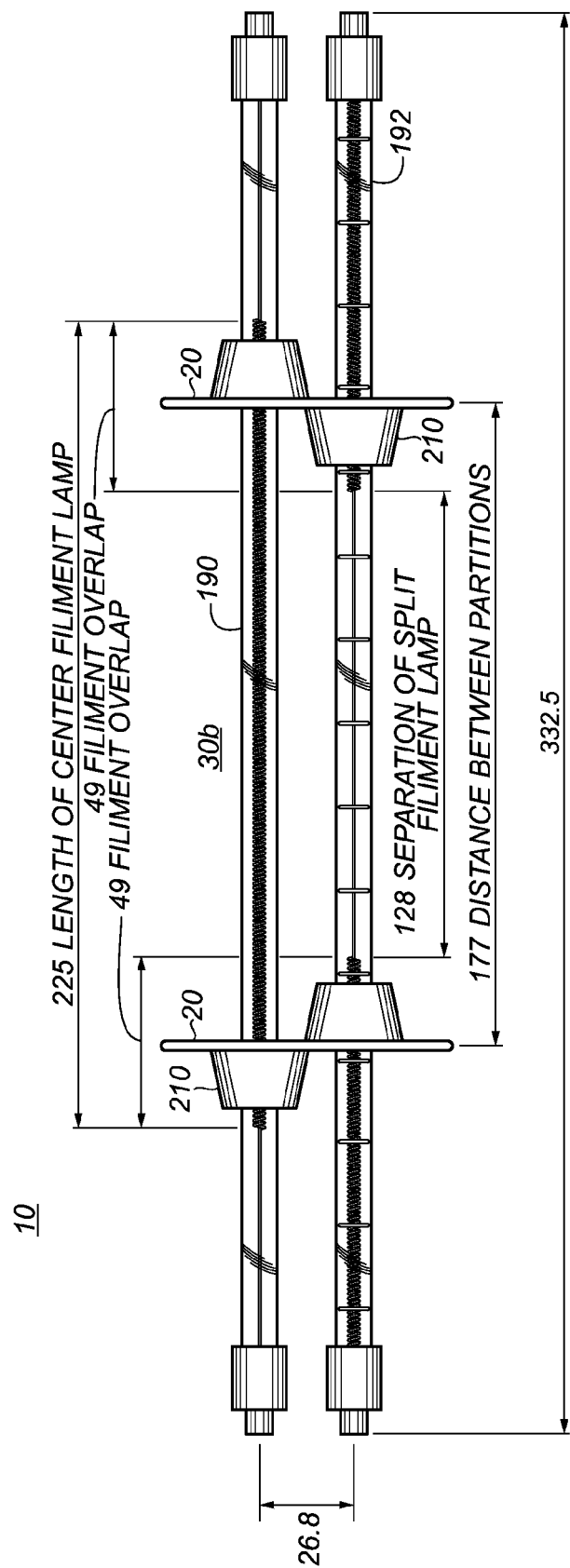
FIGS. 27-28 show exemplary dimensional information of FIG. 26A.
Figure 28:
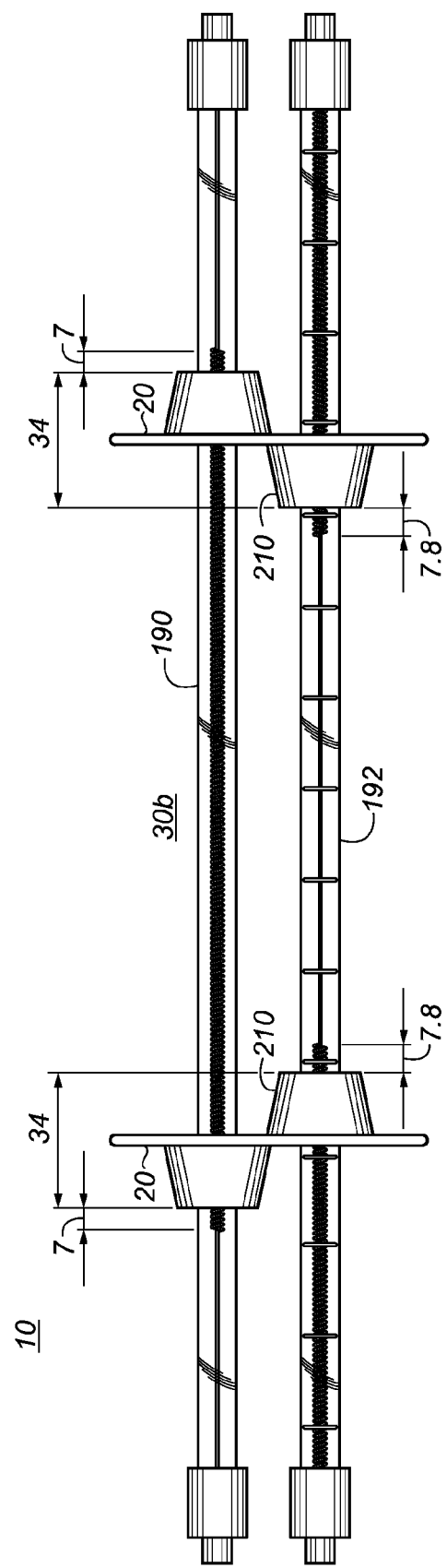

FIGS. 27 and 28 shows the example of FIG. 26 with some suitable dimensional information in an exemplary embodiment.

Figure 29:
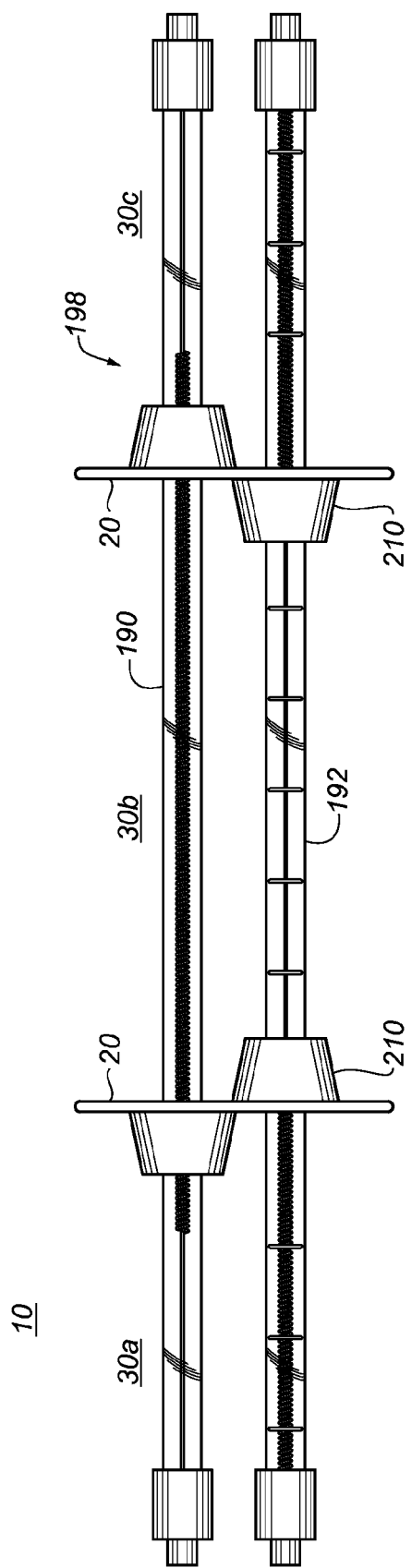
FIG. 29 shows another exemplary embodiment having two partitions, each including two cone-shaped sleeve portions.

FIG. 29 shows a further example similar to the example of FIG. 26A, however, the two cone-shaped sleeve elements 210 facing toward the center of the drum are not disposed within the overlap region 198. Rather, as illustrated, the partition 20 is disposed such that these two cone-shaped sleeve elements 210 are disposed within a region intermediate the two edge-filament regions (i.e., a region intermediate to the overlap regions).

Figure 30:
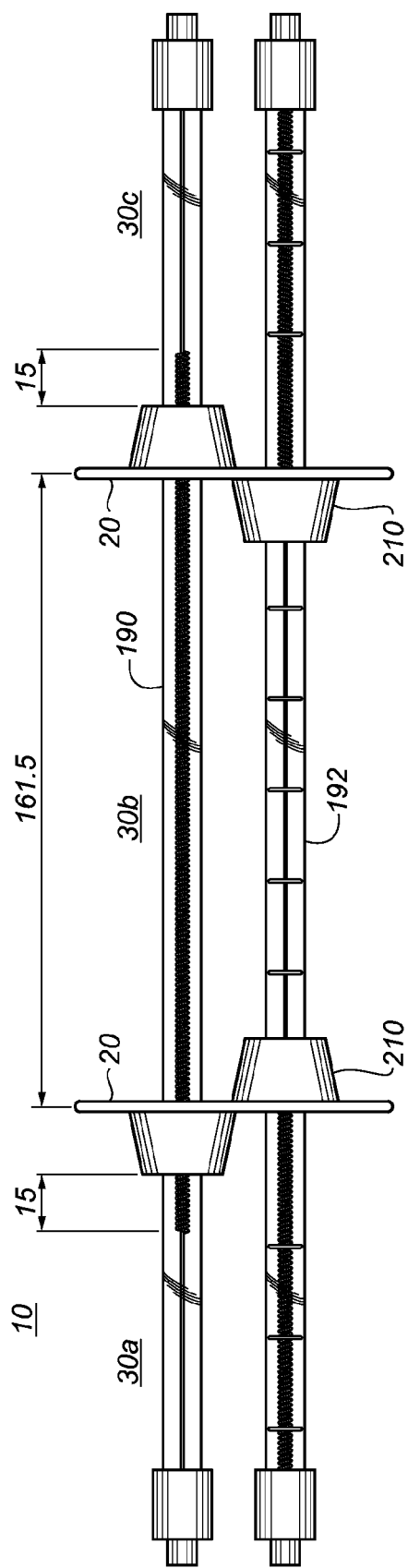
FIG. 30 shows exemplary dimensional information of FIG. 29.

FIG. 30 shows the example of FIG. 29 with some suitable dimensional information.

Figure 31:
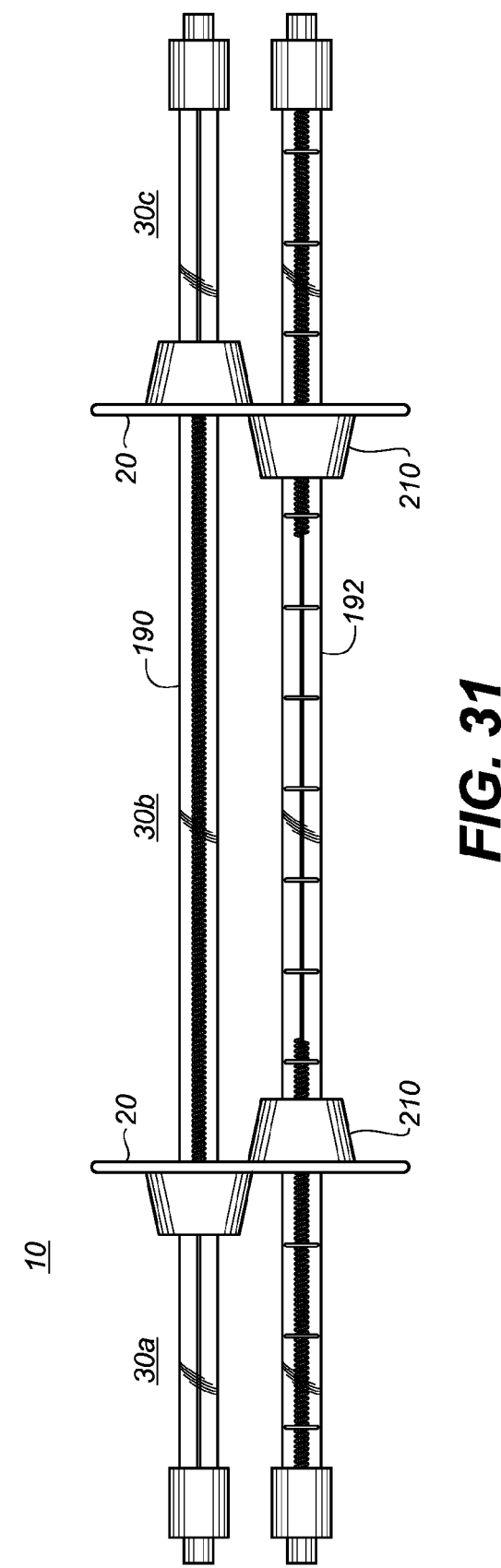
FIG. 31 shows yet another exemplary embodiment having two partitions, each including two cone-shaped sleeve portions.

FIG. 31 shows a further example similar to the example of FIG. 26, however, the two cone-shaped sleeve elements 210 associated with lamp heater 190 are facing away from the center of the drum are not disposed within the overlap region. Rather, as illustrated, the partition 20 is disposed such that these two cone-shaped sleeve elements 210 are disposed outside of an overlap region so as to be solely within an edge filament region.

Figure 32:
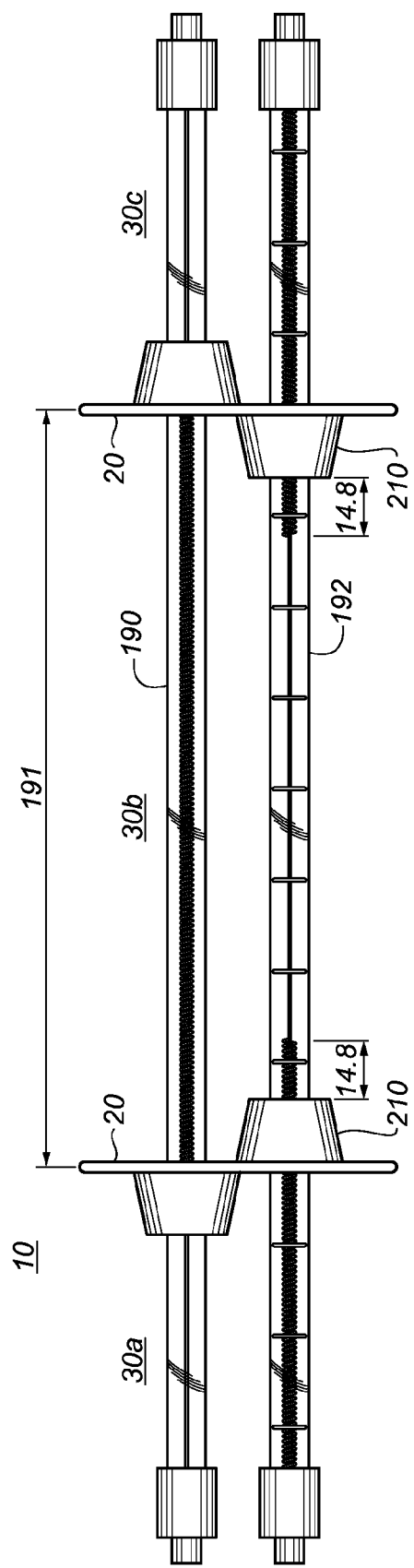
FIG. 32 shows exemplary dimensional information of FIG. 31.
Figure 33:
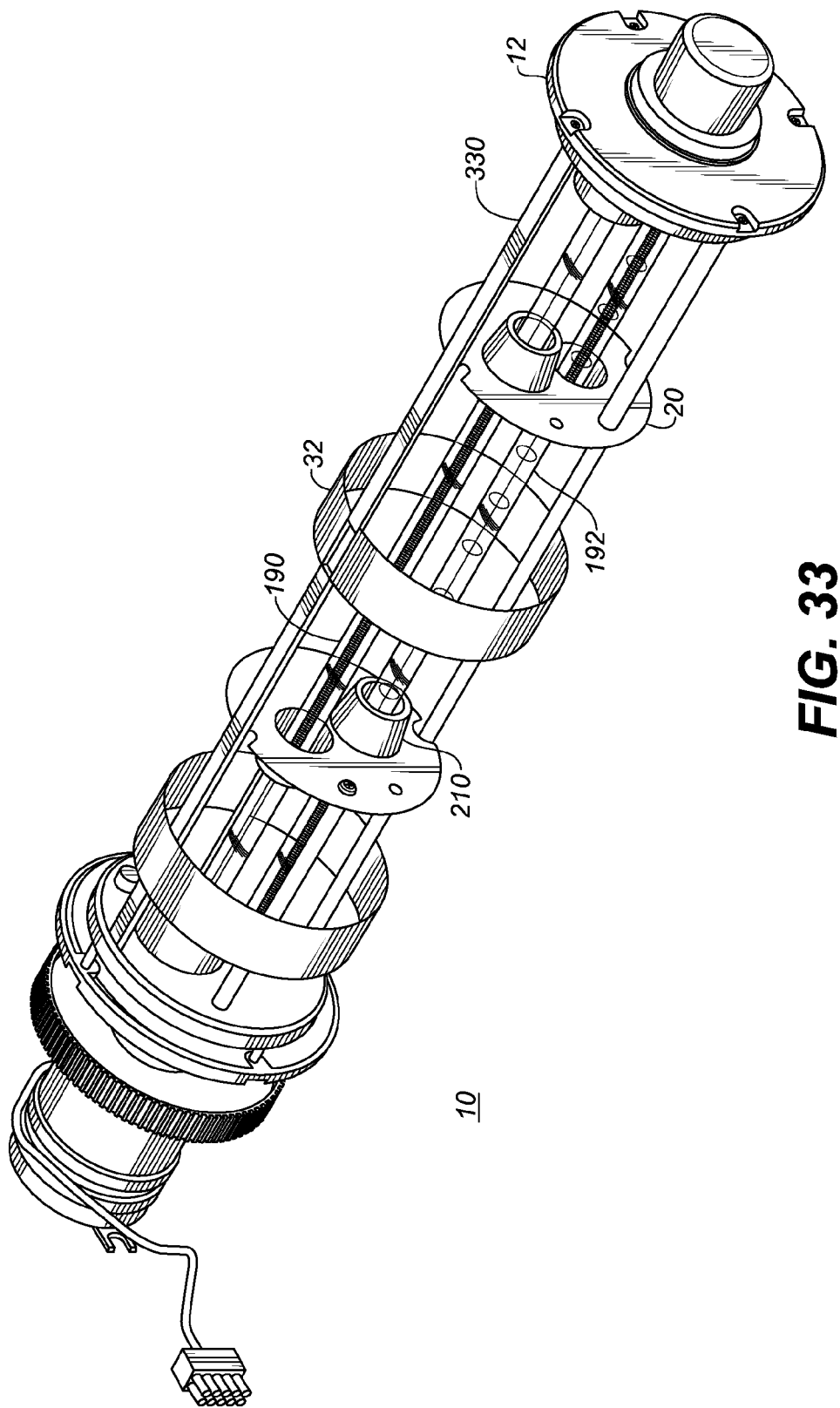
FIGS. 33-36 show various components of the partitions and/or lamp fixture/assembly.
Figure 34:
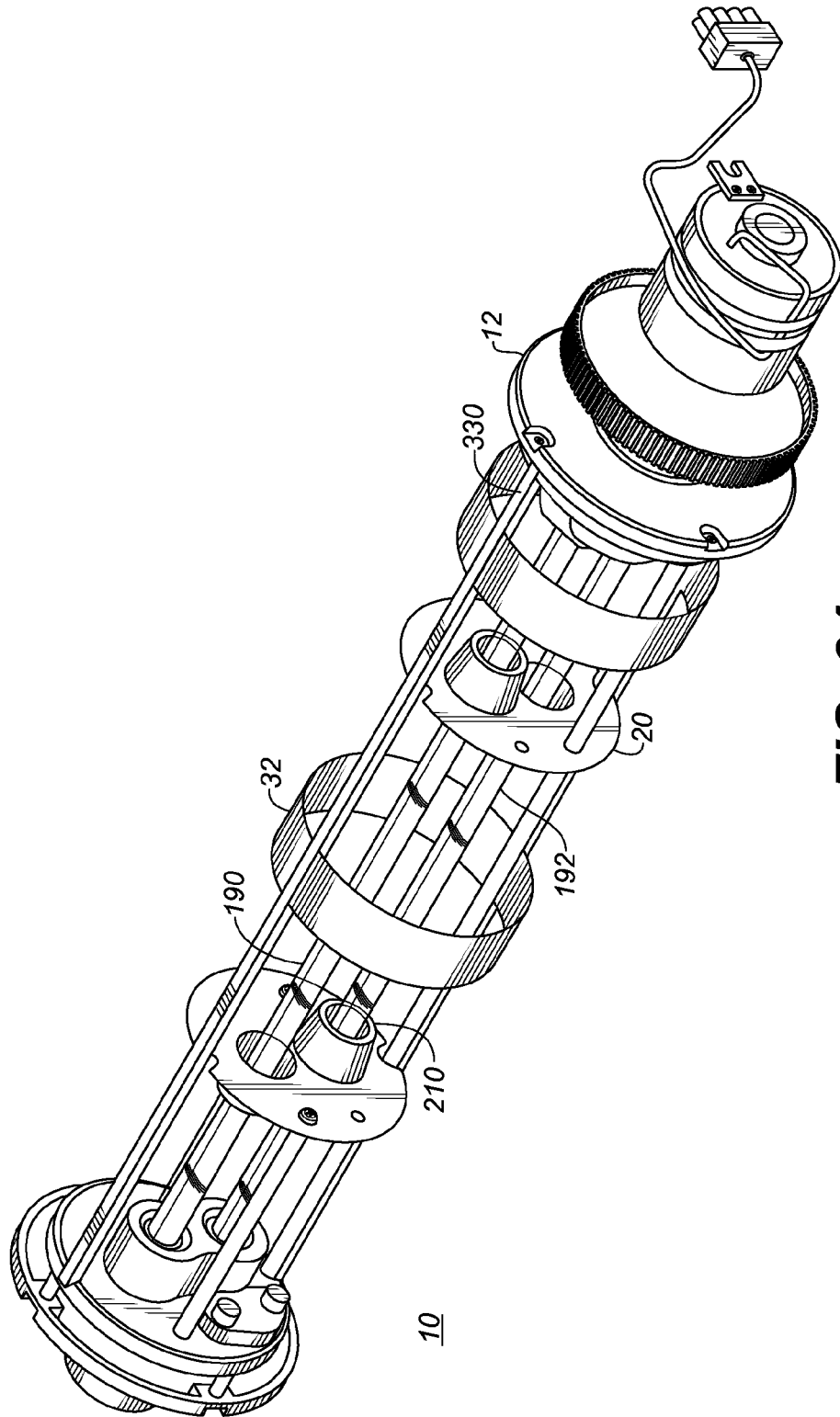
Figure 35:
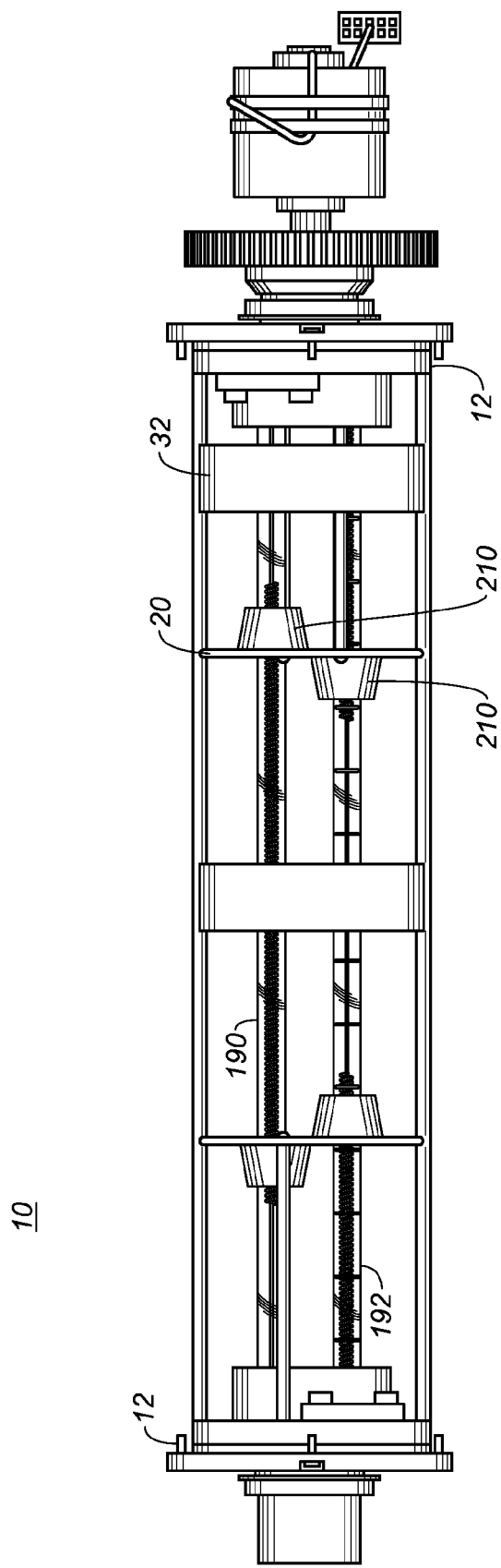
Figure 36:
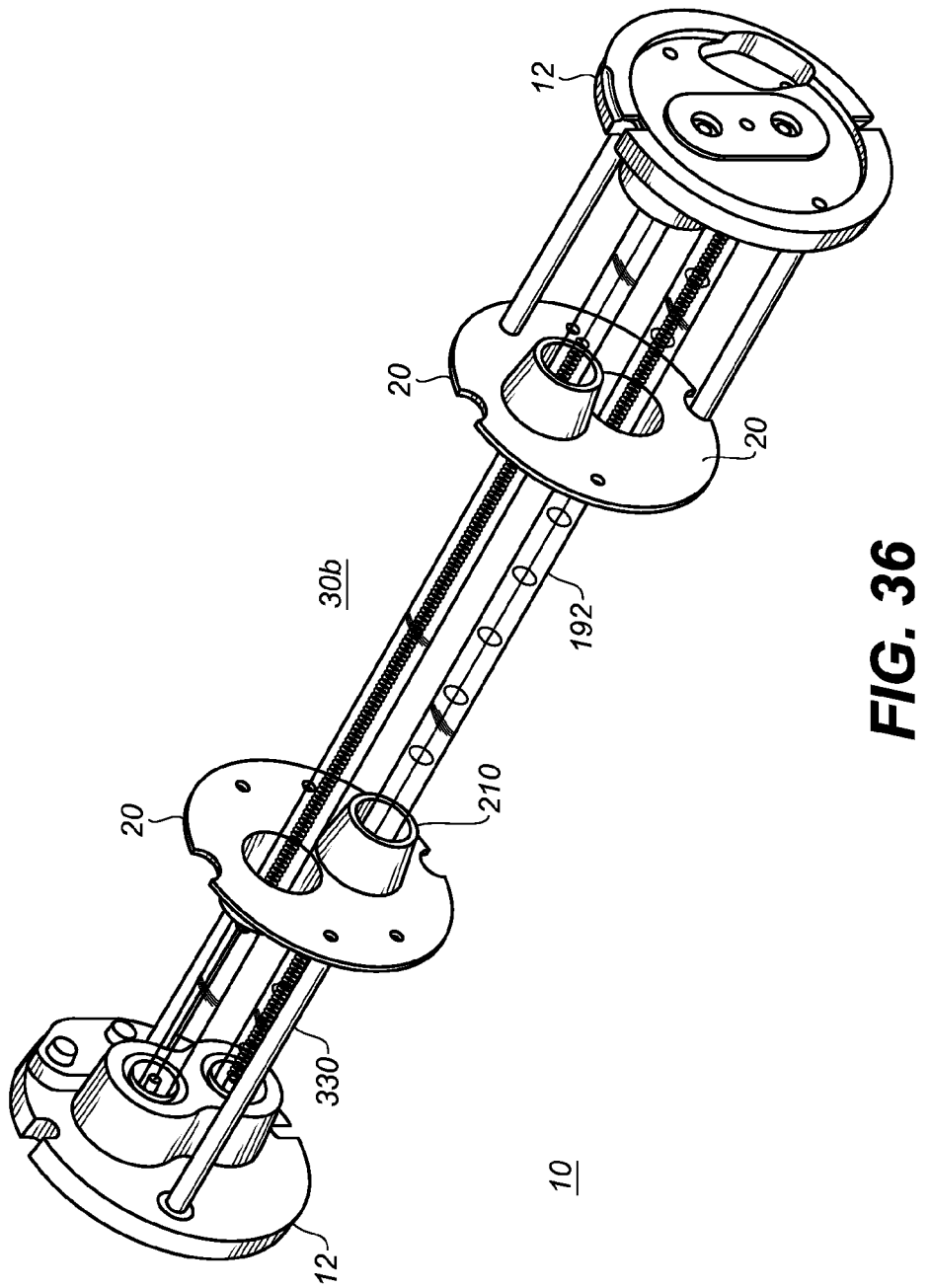

FIG. 32 shows the example of FIG. 31 with some suitable dimensional information.

FIGS. 33-36 show various electrical and mechanical mountings and components of the partitions 20 and/or lamp fixture/assembly within drum 10, again, with external covering surfaces removed. It is noted that the partitions 20 can be employed with or without the sleeve elements 210 (partitions modified with single or dual cone sleeve elements 210). In a preferred arrangement, partitions 20 are supported from the end plates 12 of the drum 10, rather than from the heated surface or inside walls. Applicants have recognized that allowing the partition 20 to contact the inside walls of the drum within the media/film contact area may result in artifacts due to uneven heating. As such, Applicants have employed standoffs 330 from the end plate 12, as shown, for example, in FIG. 36.

Figure 37:
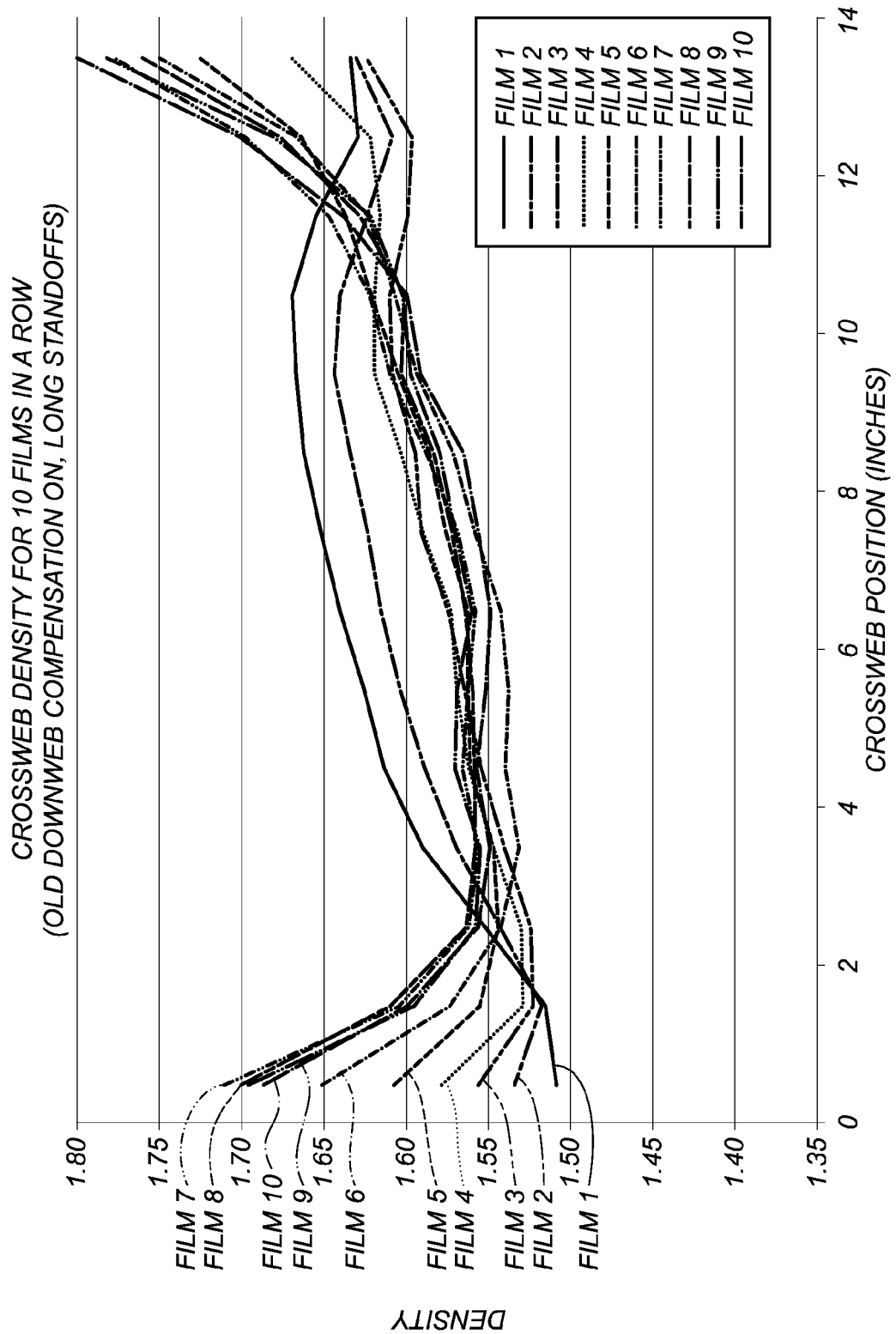
FIGS. 37-38 illustrate experimental results of crossweb density for films/media processed on a drum.
Figure 38:
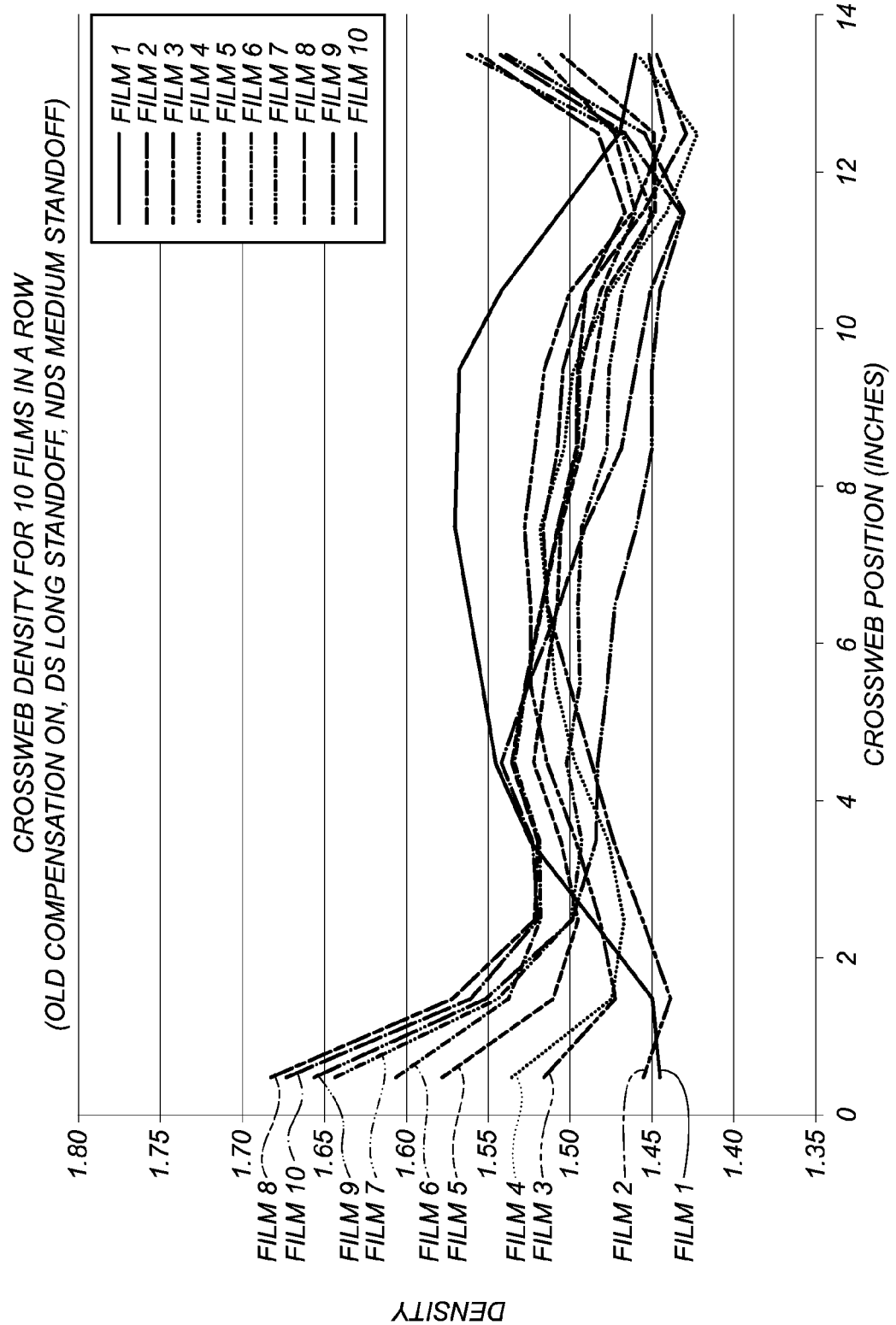

FIGS. 37-38 illustrate some experimental results of crossweb density for 10 films/media processed on a drum, wherein various configurations of the two lamp partition/element/portion are employed. The x-axis represents the media's length (i.e., crossweb position) with units in inch dimensions. The y-axis represents the media's crossweb density.

For long lamp heaters 110, a number of arrangements for internal filaments are possible. According to an embodiment, lamp heater 110 has a number of filament segments, wherein segments can be individually energized. Alternately, only a portion of the lamp heater 110 tubing has a filament.

Figure 39:
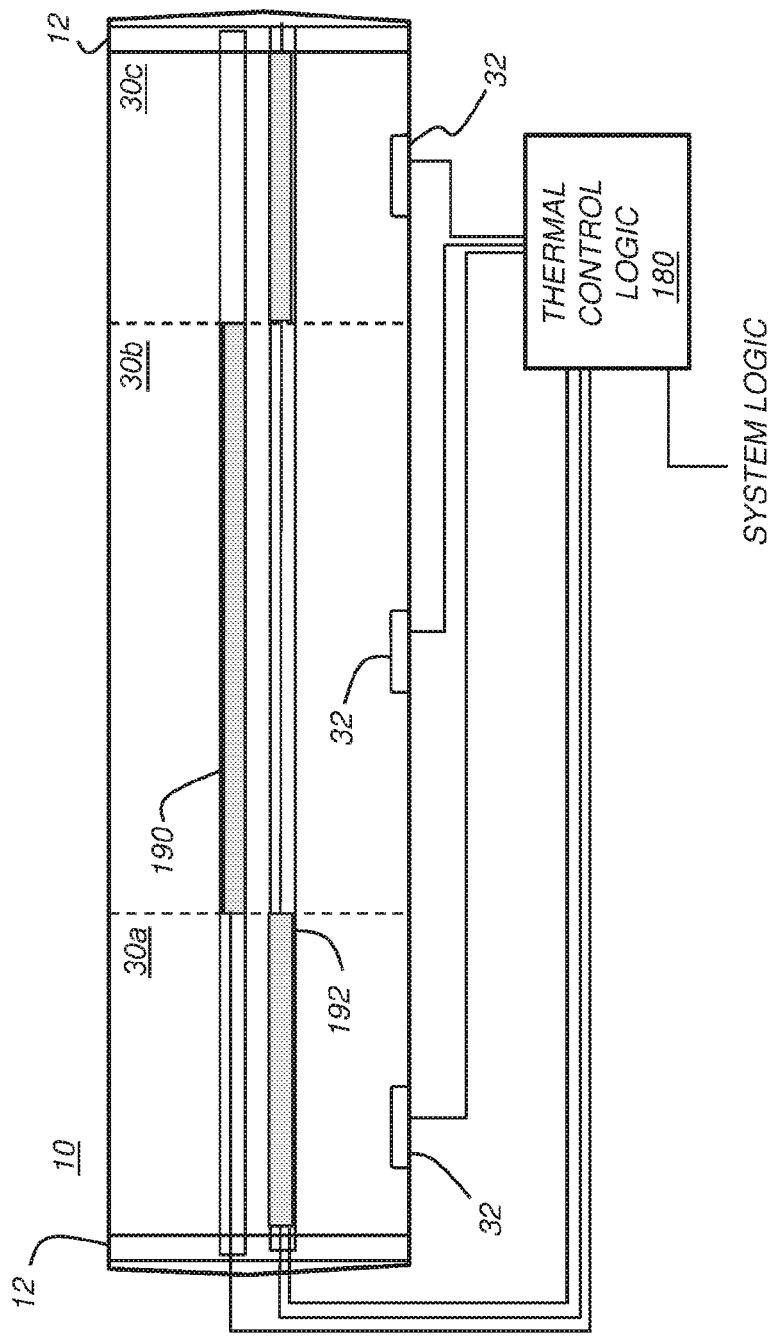
FIG. 39 is a schematic diagram that shows the function of a thermal control logic processor that controls the energization cycles of lamp heaters according to an embodiment of the present disclosure.

Applicants' system allows the thermal imaging apparatus to provide controlled thermal behavior throughout a print processing cycle. The schematic diagram of FIG. 39 shows the function of a thermal control logic processor 180 that controls the energization cycles of lamp heaters 190, 192 according to an embodiment of the present disclosure. Three heat zones 30a, 30b, and 30c are shown. Thermal control logic processor 180 can be a separate, dedicated control processor or may have its functions executed by system control logic for the overall thermal imaging system. In either case, control logic processor 180 is in signal communication with imaging system logic for instructions to control drum 10 temperature.

Continuing with FIG. 39, drum 10 temperature is monitored within each zone 30a, 30b, 30c by a sensor 32, such as using one sensor 32 for each heating zone, as shown. Based on sensor 32 feedback and, optionally, on control signals from system logic, control logic processor 180 selectively energizes filaments in one or more of the heating lamps 190, 192 for the corresponding zone. In the case of heating lamp 190, only the section or portion of filament within the middle heating zone 30b is energized. Lamps 190, 192 may have one or more unused segments of filament or, optionally, may have filaments only over a portion of the glass tube.

Accordingly, Applicants have described a drum for thermally developing an image in an imaging media having a development temperature, comprising: two lamp heaters, each heater positioned in a direction along the axis of the drum, one heater comprising a center filament and the other heater comprising two end/zone filaments; and a first partition disposed along the axis of the drum, substantially perpendicular to the axis of the drum, the first partition including a first cone-shaped portion extending in a first direction along the axis of the drum.

In one arrangement, the first partition and first cone-shaped portion include a first opening whereby one heater is disposed therethrough.

In one arrangement, the first partition further comprises a second cone-shaped portion extending in a second direction along the axis of the drum, opposite the first direction.

In one arrangement, the first partition is disposed in an overlap region of the center filament with one of the end filaments.

In one arrangement, the drum further comprises a second partition disposed along the axis of the drum spaced from the first partition, the second partition including a first cone-shaped portion extending in a second direction along the axis of the drum, opposite the first direction.

In yet a further arrangement, the first partition including a second cone-shaped portion extending in the second direction along the axis of the drum; and the second partition including a second cone-shaped portion extending in the first direction along the axis of the drum.

In one arrangement, the first partition is disposed in an overlap region of the center filament with one of the end filaments, and wherein the second partition is disposed in an overlap region of the center filament with the other of the end filaments.

Applicants have described a drum for thermally developing an image in an imaging media having a development temperature, comprising: two lamp heaters, each heater positioned in a direction along the axis of the drum, one heater comprising a center filament and the other heater comprising two end/zone filaments; a first partition disposed along the axis of the drum, substantially perpendicular to the axis of the drum, the first partition including a first cone-shaped portion extending in a first direction along the axis of the drum; and a second partition disposed along the axis of the drum, substantially perpendicular to the axis of the drum, the first partition including a second cone-shaped portion extending in a first direction along the axis of the drum.

Applicants have described a thermal processor for thermally developing an image in an imaging media having a development temperature, comprising: a drum, as set forth above, configured to move the imaging media along a transport path, and to receive the imaging media at a first temperature and to heat the imaging media to a second temperature greater than the first temperature.

Applicants have described a drum for thermally developing an image in an imaging media having a development temperature, comprising: a first lamp heater disposed within a first and second end zone of the drum; a second lamp disposed within a central zone of the drum, the central zone located intermediate the first and second end zones, each of the two lamps positioned in a direction along the axis of the drum; a first partition disposed along the axis of the drum, positioned at or within a transition region between the first end zone and the central zone, the first partition including a cone-shaped portion extending in a first direction along the axis of the drum; and a second partition disposed along the axis of the drum, positioned at or within a transition region between the second end zone and the central zone, the second partition including a cone-shaped portion extending in a second direction along the axis of the drum, opposite the first direction.

In one arrangement, the first partition including another cone-shaped portion extending in the second direction along the axis of the drum; and the second partition including another cone-shaped portion extending in the first direction along the axis of the drum.

Accordingly, Applicants have described a drum for thermally developing an image in an imaging media having a development temperature, comprising: an arrangement of lamp heaters, each heater positioned to extend in a direction parallel to the axis of rotation of the drum. The heating drum can be partitioned into two or more heating zones, with or without partitioning structures.

Applicants have described a thermal processor for thermally developing an image in an imaging media having a development temperature, comprising: a drum, as set forth above, configured to move the imaging media along a transport path, and to receive the imaging media at a first temperature and to heat the imaging media to a second temperature greater than the first temperature.

The drum described in this disclosure is suitable for use in/with an apparatus and method for thermally processing an imaging material, such as described in U.S. Pat. No. 9,195,185 (Struble) and U.S. Pat. No. 7,317,468 (Struble), both of which are incorporated herein in their entirety.

A computer program product may include one or more non-transitory storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The methods described above may be described with reference to a flowchart. Describing the methods by reference to a flowchart enables one skilled in the art to develop such programs, firmware, or hardware, including such instructions to carry out the methods on suitable computers, executing the instructions from computer-readable media. Similarly, the methods performed by the service computer programs, firmware, or hardware are also composed of computer-executable instructions.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

In the following claims, the terms "first," "second," and "third," and the like, are used merely as labels, and are not intended to impose numerical requirements on their objects.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A cylindrical drum for processing a thermal image medium, the drum having an axis of rotation, comprising:
   first and second end plates that each extend orthogonally to the axis of rotation and enclose an inner core of the drum;
   first and second inner partitions disposed along the axis of rotation, and defining a first end zone in the inner core lying between the first inner partition and the first end plate, a second end zone in the inner core lying between the second inner partition and the second end plate, and a middle zone in the inner core lying between the first and second inner partitions, wherein each of the inner partitions has a plurality of sleeve portions that extend outward from said each of the inner partitions, in an axial direction;
   a first lamp heater extending parallel to the axis and through one or more sleeve portions and having a first filament disposed within the first end zone and a second filament disposed within the second end zone; and
   a second lamp heater extending parallel to the axis and through one or more sleeve portions and having a central filament disposed within the middle zone.

2. The drum of claim 1 wherein a portion of at least one of the first and second filaments extends into the middle zone.

3. The drum of claim 1 wherein a portion of the central filament extends into the first or the second end zone.

4. The drum of claim 1 wherein one or more of the sleeve portions is cone shaped.

5. The drum of claim 1 wherein at least one of the sleeve portions of the first inner partition is formed as an integral part of the partition.

6. The drum of claim 1 wherein at least one of the sleeve portions of the first inner partition extends toward the middle of the drum and another of the sleeve portions of the first inner partition extends toward the first end plate.

7. The drum of claim 1 wherein at least one of the sleeve portions is disposed in a region wherein the first filament and central filament overlap with respect to the axis of rotation.

8. The drum of claim 1 wherein at least one of the sleeve portions of the first inner partition is formed of a material different from the partition.

9. The drum of claim 1 wherein at least one of the sleeve portions of the first inner partition is cylindrical.

10. A thermal processor for thermally developing an image in an imaging media having a development temperature, comprising a drum as set forth in claim 1, configured to move the imaging media along a transport path, and to receive the imaging media at a first temperature and to heat the imaging media to a second temperature greater than the first temperature.

11. A drum for thermally developing an image in an imaging media having a development temperature, comprising:
   two lamp heaters, each heater positioned in a direction along the axis of the drum, one heater comprising a center filament and the other heater comprising two end/zone filaments; and
   a first partition plate disposed along the axis of the drum at or near an end of the center filament, substantially perpendicular to the axis of the drum, the first partition plate including a first cone-shaped portion extending in a first direction along the axis of the drum.

12. The drum according to claim 11, wherein the first partition plate and first cone-shaped portion include a first opening whereby one heater is disposed therethrough.

13. The drum according to claim 11, wherein the first partition plate further comprises a second cone-shaped portion extending in a second direction along the axis of the drum, opposite the first direction.

14. The drum according to claim 11, wherein the first partition plate is disposed in an overlap region of the center filament with one of the end filaments.

15. The drum according to claim 11, further comprising a second partition plate disposed along the axis of the drum spaced from the first partition plate, the second partition plate including a second cone-shaped portion extending in a second direction along the axis of the drum, opposite the first direction.

16. The drum according to claim 15, further comprising:
   the first partition plate including a third cone-shaped portion extending in the second direction along the axis of the drum; and
   the second partition plate including a fourth cone-shaped portion extending in the first direction along the axis of the drum.

17. The drum according to claim 15, wherein the first partition plate is disposed in an overlap region of the center filament with a first one of the end filaments, and wherein the second partition plate is disposed in an overlap region of the center filament with a second one of the end filaments.

18. A drum for thermally developing an image in an imaging media having a development temperature, comprising:
   two lamp heaters, each heater positioned in a direction along the axis of the drum, one heater comprising a center filament and the other heater comprising two end/zone filaments;
   a first partition plate disposed along the axis of the drum at or near an end of the center filament, substantially perpendicular to the axis of the drum, the first partition plate including a first cone-shaped portion extending in a first direction along the axis of the drum; and
   a second partition plate disposed along the axis of the drum, substantially perpendicular to the axis of the drum, the second partition plate including a second cone-shaped portion extending in a second direction along the axis of the drum.

19. A drum for thermally developing an image in an imaging media having a development temperature, comprising:
   a first lamp heater disposed within a first and second end zone of the drum;
   a second lamp heater disposed within a central zone of the drum, the central zone located intermediate the first and second end zones, each of the two lamp heaters positioned in a direction along the axis of the drum;
   a first partition plate disposed along the axis of the drum, positioned at or within a transition region between the first end zone and the central zone, the first partition plate including a first cone-shaped portion extending in a first direction along the axis of the drum; and
   a second partition plate disposed along the axis of the drum, positioned at or within a transition region between the second end zone and the central zone, the second partition plate including a second cone-shaped portion extending in a second direction along the axis of the drum, opposite the first direction.

20. The drum according to claim 19, further comprising:
   the first partition plate including a third cone-shaped portion extending in the second direction along the axis of the drum; and the second partition plate including a fourth cone-shaped portion extending in the first direction along the axis of the drum.

21. A cylindrical drum for processing a thermal image medium, the drum having an axis of rotation and comprising:
- first and second end plates that each extend orthogonally to the axis of rotation and enclose an inner core of the drum;
- first, second, and third lamp heaters, each within the core and each extending in the direction of the axis of rotation, wherein the first lamp heater heats a first heat zone within the core, the second lamp heater heats a second heat zone within the core, and the third lamp heater heats a third heat zone within the core; and
- at least one partition plate that defines a boundary between the first and the second heat zones within the core, the partition plate extending orthogonally to the axis of rotation.

22. The drum of claim 21 wherein the first lamp heater provides a major portion of the heat within the first heat zone.

23. The drum of claim 21 wherein at least one of the lamp heaters has both energized and de-energized portions of filament.

24. The drum of claim 21 wherein the drum is configured to raise the temperature of the processed thermal image medium.

25. A cylindrical drum for processing a thermal image medium, the drum having an axis of rotation and comprising:
- first and second end plates that each extend orthogonally to the axis of rotation and enclose an inner core of the drum;
- first and second inner partition plates disposed along the axis of rotation, defining a first zone in the inner core lying between the first partition plate and the first end plate, a second zone in the inner core lying between the second partition plate and the second end plate, and a middle zone in the inner core lying between the first and second partition plates;
- a first lamp heater positioned within the first zone;
- a second lamp heater positioned within the second zone;
- a third lamp heater positioned within the middle zone; and
- a heater control configured to independently energize the first, second, and third lamp heaters.

26. The drum of claim 25 wherein the second lamp heater includes one or more portions of filament that are de-energized.

* * * * *